(12) United States Patent
Kameda et al.

(10) Patent No.: US 12,157,838 B2
(45) Date of Patent: Dec. 3, 2024

(54) HYDROGENATED COPOLYMER COMPOSITION, ADHESIVE MATERIAL COMPOSITION, AND ADHESIVE FILM

(71) Applicant: Asahi Kasei Kabushiki Kaisha, Tokyo (JP)

(72) Inventors: Ippei Kameda, Tokyo (JP); Kenta Shibuya, Tokyo (JP); Yuta Kamei, Tokyo (JP); Toshikazu Hoshina, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 732 days.

(21) Appl. No.: 17/299,399

(22) PCT Filed: Dec. 6, 2019

(86) PCT No.: PCT/JP2019/047864
§ 371 (c)(1),
(2) Date: Jun. 3, 2021

(87) PCT Pub. No.: WO2020/116625
PCT Pub. Date: Jun. 11, 2020

(65) Prior Publication Data
US 2022/0049137 A1 Feb. 17, 2022

(30) Foreign Application Priority Data

Dec. 7, 2018 (JP) ................. 2018-229520

(51) Int. Cl.
| C09J 153/02 | (2006.01) |
| C08F 297/04 | (2006.01) |
| C08L 53/02 | (2006.01) |
| C09J 7/30 | (2018.01) |
| C09J 11/08 | (2006.01) |

(52) U.S. Cl.
CPC ......... *C09J 153/025* (2013.01); *C08F 297/04* (2013.01); *C08L 53/025* (2013.01); *C09J 7/30* (2018.01); *C09J 11/08* (2013.01); *C08L 2205/03* (2013.01); *C09J 2453/00* (2013.01)

(58) Field of Classification Search
CPC .... C08F 297/04; C08L 53/025; C09J 153/025
See application file for complete search history.

(56) References Cited

U.S. PATENT DOCUMENTS

| 4,970,259 A | 11/1990 | Mitchell et al. |
| 2002/0147274 A1 | 10/2002 | Sasagawa et al. |
| 2010/0015442 A1 | 1/2010 | Shimoura et al. |
| 2011/0245405 A1 | 10/2011 | Jogo et al. |
| 2015/0322306 A1 | 11/2015 | Masuko et al. |
| 2015/0322307 A1 | 11/2015 | Masuko et al. |
| 2017/0002190 A1 | 1/2017 | Hisasue et al. |
| 2017/0088757 A1 | 3/2017 | Nakatani et al. |
| 2018/0223140 A1 | 8/2018 | Minamide et al. |
| 2018/0237556 A1 | 8/2018 | Ichino et al. |
| 2019/0077947 A1 | 3/2019 | Nojima et al. |
| 2019/0136040 A1 | 5/2019 | Ichino et al. |

FOREIGN PATENT DOCUMENTS

| EP | 3098279 A1 | 11/2016 |
| JP | 2006-299024 A | 11/2006 |
| JP | 2006-526699 A | 11/2006 |
| JP | 2008-274211 A | 11/2008 |
| JP | 2010-538145 A | 12/2010 |
| JP | 2012-236901 A | 12/2012 |
| JP | 5158151 B2 | 3/2013 |
| JP | 2014-114343 A | 6/2014 |
| JP | 2014-114345 A | 6/2014 |
| JP | 2014-129479 A | 7/2014 |
| JP | 2014-148638 A | 8/2014 |
| JP | 2016-020508 A | 2/2016 |
| JP | 2016-186049 A | 10/2016 |
| JP | 2017-197609 A | 11/2017 |
| TW | 201533195 A | 9/2015 |
| TW | 201712049 A | 4/2017 |
| WO | 01/85818 A1 | 11/2001 |

(Continued)

OTHER PUBLICATIONS

International Search Report issued in corresponding International Patent Application No. PCT/JP2019/047864 dated Mar. 10, 2020.
Written Opposition to Japanese Patent No. 7079859 mailed Dec. 21, 2022.
Notice of Reasons for Revocation issued in Japanese Patent No. 7079859 mailed Feb. 22, 2023.
International Preliminary Report on Patentability and Written Opinion issued in corresponding International Patent Application No. PCT/JP2019/047864 dated Jun. 17, 2021.
European Search Report issued in related European Patent Application No. 19893664.3 dated Dec. 17, 2021.

*Primary Examiner* — Vickey Nerangis

(74) *Attorney, Agent, or Firm* — Morgan, Lewis & Bockius LLP

(57) ABSTRACT

An object of the present invention is to provide a hydrogenated copolymer composition and the like having an excellent balance among initial tack strength, suppression of increase in tackiness, and suppression of uneven thicknesses of a tacky layer. The object can be achieved with the following hydrogenated copolymer composition. A hydrogenated copolymer composition comprising: a component (a) comprising a polymer block comprising a vinyl aromatic monomer unit as a main component and a polymer block comprising a conjugated diene monomer unit as a main component; and a component (b) comprising a polymer block comprising a vinyl aromatic monomer unit as a main component and a polymer block comprising a conjugated diene monomer unit as a main component.

7 Claims, No Drawings

(56) References Cited

FOREIGN PATENT DOCUMENTS

| WO | 2004/108784 A1 | 12/2004 | |
|---|---|---|---|
| WO | 2007/126081 A1 | 11/2007 | |
| WO | 2009/032501 A2 | 3/2009 | |
| WO | 2015/111669 A1 | 7/2015 | |
| WO | 2015/178259 A1 | 11/2015 | |
| WO | 2016/031550 A1 | 3/2016 | |
| WO | 2017/033987 A1 | 3/2017 | |
| WO | WO-2017126469 A1 * | 7/2017 | ........... B32B 27/065 |
| WO | 2017/159800 A1 | 9/2017 | |
| WO | 2017/188190 A1 | 11/2017 | |

* cited by examiner

HYDROGENATED COPOLYMER COMPOSITION, ADHESIVE MATERIAL COMPOSITION, AND ADHESIVE FILM

TECHNICAL FIELD

The present invention relates to a hydrogenated copolymer composition, an adhesive material composition, and an adhesive film.

BACKGROUND ART

Block copolymers comprising a vinyl aromatic monomer unit and a conjugated diene monomer unit, which have elasticity comparable to that of vulcanized natural rubber and synthetic rubber at normal temperature, even when not vulcanized, and furthermore have fabricability comparable to that of a thermoplastic resin at high temperatures, are widely used in fields such as footwear, plastic modification, asphalt modification, and adhesive materials, household products, packaging materials for consumer electrical appliances and industrial parts, toys, and the like. The hydrogenated products of the block copolymer, which has excellent weatherability and heat resistance, are widely used also in automotive parts and medical devices in addition to the application fields as aforementioned.

Particularly when used as adhesives, such hydrogenated products are used as hot melts for hygiene products and building material applications, or primarily as labels, tape, or surface protection films by imparting a tacky layer to the film surface. Conventionally, acrylic adhesives, and rubber-based adhesives mainly containing rubbers such as natural rubber and polyisobutylene, are primarily used as adhesives for the tacky layer of such a film. Methods involving applying, with a roll, spray, or the like, an adhesive solution in which an adhesive is dissolved in a solvent are used as methods for applying such an adhesive to a predetermined support film. Although such methods are capable of forming the adhesive layer uniformly and thinly and are thus advantageous, the methods have a problem in that the use of a solvent is not preferable from the viewpoint of air pollution, fire, safety and health during production, economy, and so on.

For such a reason, recently, coextrusion films have been suitably used that integrally includes a substrate layer made of a polyolefin resin and an adhesive layer containing a hydrogenated styrene elastomer or olefinic elastomer.

In these applications, suppression of increase in tackiness and improvement in fabricability are required, in addition to tack strength in accordance with the application. For example, Patent Literature 1 describes a tacky film targeted for simultaneously achieving fabricability and tackiness without mixing of a tackifier but does not refer to increase in tackiness, and the film still leaves room for improvement. Patent Literature 2 describes a tacky film excellent in initial tackiness, low temperature tackiness, feedability, low increase in tackiness, and balance of the properties, but does not refer to moldability, and the film still leaves room for improvement. Patent Literature 3 describes a tacky adhesive composition targeted for initial tack strength, low increase in tackiness, suppression of surface contamination, suppression of adhesive residues, and suppression of zipping, but is characteristic of use of a specific tacky resin compound. Thus, room for improvement still remains in a substantial solution of these problems by the hydrogenated copolymer composition.

CITATION LIST

Patent Literature

Patent Literature 1: Japanese Patent No. 5158151
Patent Literature 2 Japanese Patent Laid-Open No. 2017-197609
Patent Literature 3 Japanese Patent Laid-Open No. 2014-114345

SUMMARY OF INVENTION

Technical Problem

According to the research of the present inventors, uneven thicknesses of the tacky layer are not only regarded as a problem during fabrication but also affect tack strength and increase in tackiness. Uneven thicknesses of the tacky layer may lead to lifting of the film, adhesive residues, and zipping during peeling, and thus, suppression of such uneven thicknesses is particularly important. In respect of a combination of initial tack strength, suppression of increase in tackiness, and suppression of uneven thicknesses of a tacky layer in a highly well-balanced manner, conventional resin compositions still leave room for improvement.

In view of the aforementioned problems of conventional art, an object of the present invention is to provide a hydrogenated copolymer composition, an adhesive material composition, and an adhesive film having an excellent balance among initial tack strength, suppression of increase in tackiness, and suppression of uneven thicknesses of a tacky layer, when used as an adhesive material.

Solution to Problem

In order to solve the above problems of conventional art, the inventors have conducted diligent research and, as a result, have found that a hydrogenated copolymer composition including two components each having a specific structure effectively solves the above problems, having accomplished the present invention.

That is to say, the present invention is as set forth below.

[1]
A hydrogenated copolymer composition comprising:
a component (a) comprising a polymer block comprising a vinyl aromatic monomer unit as a main component and a polymer block comprising a conjugated diene monomer unit as a main component; and
a component (b) comprising a polymer block comprising a vinyl aromatic monomer unit as a main component and a polymer block comprising a conjugated diene monomer unit as a main component, wherein
the component (a) has a peak top molecular weight of 50,000 to 120,000,
the component (b) has a peak top molecular weight 1.8 times to 3.8 times the peak top molecular weight of the component (a),
81 mol % or more of double bonds of the conjugated diene monomer unit included in the hydrogenated copolymer composition is hydrogenated,
a content of the vinyl aromatic monomer unit included in the hydrogenated copolymer composition is 5 to 18 mass % based on the composition,
a block content of the vinyl aromatic monomer unit included in the hydrogenated copolymer composition is 75 mass % or more, a melt flow rate (MFR) of the hydrogenated copolymer composition is 4 to 20 g/10 min,
a capillary viscosity of the hydrogenated copolymer composition is 300 to 600 Pa·s, and
when the capillary viscosity is denoted by C [Pa·s] and the MFR is denoted by M [g/10 min], a relationship of (Expression 1):

$$C \leq -20.8M + 754.2 \qquad \text{(Expression 1)}$$

is satisfied.

[2]

The hydrogenated copolymer composition according to [1], wherein the component (a)/the component (b) in terms of mass proportion is 60/40 to 10/90.

[3]

The hydrogenated copolymer composition according to [1] or [2], wherein a vinyl bond content of the conjugated diene monomer unit included in the hydrogenated copolymer composition is 40 mol % to 70 mol %.

[4]

The hydrogenated copolymer composition according to [3], wherein the vinyl bond content is 40 mol % to 61.9 mol %.

[5]

The hydrogenated copolymer composition according to any of [1] to [4], wherein the component (a) and the component (b) are each represented by the following formulas:

B2-A1-B1 and/or B2-A1-B1-X     component (a):

(B2-A1-B1)$n$X     component (b):

wherein
A1 is a polymer block comprising a vinyl aromatic monomer unit as a main component,
B1 and B2 are each independently a polymer block comprising a conjugated diene monomer unit as a main component,
n is an integer of 2 or greater, and
X is a residue of a coupling agent.

[6]

The hydrogenated copolymer composition according to [5], wherein a content of B1 included in the hydrogenated copolymer composition is 3 to 10 mass % based on the composition.

[7]

An adhesive material composition comprising the hydrogenated copolymer composition according to any of [1] to [6] and a tackifier.

[8]

An adhesive film comprising the adhesive material composition according to [7].

Advantageous Effect of Invention

According to the present invention, there can be provided a hydrogenated copolymer composition, an adhesive material composition, and an adhesive film having a highly excellent balance among initial tack strength, suppression of increase in tackiness, and suppression of uneven thicknesses of a tacky layer, when used as a tacky adhesive material.

DESCRIPTION OF EMBODIMENT

Hereinafter, an embodiment for carrying out the present invention (hereinafter referred to as "the present embodiment") will now be described in detail, but the present invention is not limited to the following embodiment, and can be performed after making various modifications within the scope of the present invention.

[Hydrogenated Copolymer]

A hydrogenated copolymer composition of the present embodiment comprises:

a component (a) comprising a polymer block comprising a vinyl aromatic monomer unit as a main component and a polymer block comprising a conjugated diene monomer unit as a main component; and a component (b) comprising a polymer block comprising a vinyl aromatic monomer unit as a main component and a polymer block comprising a conjugated diene monomer unit as a main component, wherein the component (a) has a peak top molecular weight of 50,000 to 120,000, the component (b) has a peak top molecular weight 1.8 times to 3.8 times the peak top molecular weight of the component (a), 81 mol % or more of the double bonds of the conjugated diene monomer unit included in the hydrogenated copolymer composition is hydrogenated, the content of the vinyl aromatic monomer unit included in the hydrogenated copolymer composition is 5 to 18 mass % based on the composition, the block content of the vinyl aromatic monomer unit included in the hydrogenated copolymer composition is 75 mass % or more, the melt flow rate (MFR) of the hydrogenated copolymer composition is 4 to 20 g/10 min, the capillary viscosity of the hydrogenated copolymer composition is 300 to 600 Pa·s, and when the capillary viscosity is denoted by C [Pa·s] and the MFR is denoted by M [g/10 min], the relationship of (Expression 1):

$$C \leq -20.8M + 754.2 \qquad \text{(Expression 1)}$$

is satisfied.

In the present embodiment, each monomer unit constituting the copolymer is named after the monomer from which the monomer unit is derived.

For example, the "vinyl aromatic monomer unit" means a constitutional unit of a polymer produced as a result of polymerizing a monomer vinyl aromatic compound. The vinyl aromatic monomer unit is bonded to other monomer units via the vinyl groups of the vinyl aromatic compound.

Moreover, the "conjugated diene monomer unit" means a constitutional unit of a polymer produced as a result of polymerizing a monomer conjugated diene compound. The conjugated diene monomer unit is bonded to other monomer units via one of the two double bonds of the conjugated diene compound (1,2-bond or 3,4-bond) or bonded to other monomer units via both the two double bonds of the conjugated diene compound (1,4-bond).

The hydrogenated copolymer composition of the present embodiment comprises the component (a) and the component (b). The total content of the component (a) and the component (b) is preferably 90 mass % or more, more preferably 95 mass % or more, and yet more preferably 100 mass % based on the hydrogenated copolymer composition.

The component (a) comprises a polymer block A comprising a vinyl aromatic monomer unit as a main component and a polymer block B comprising a conjugated diene monomer unit as a main component. The component (a) may comprise one or more polymer blocks A and one or more polymer blocks B.

The content of the polymer block A included in the component (a) is preferably 4 to 16 mass %, more preferably 6 to 14 mass %, and yet more preferably 8 to 12 mass % based on the component (a).

The content of the polymer block B included in the component (a) is preferably 84 to 96 mass %, more preferably 86 to 94 mass %, and yet more preferably 88 to 92 mass % based on the component (a).

The total content of the polymer block A and the polymer block B included in the component (a) is preferably 90 mass % or more, more preferably 95 mass % or more, and yet more preferably 100 mass % based on the component (a).

The polymer block A included in the component (a) comprises a vinyl aromatic monomer unit as a main component. The amount of the vinyl aromatic monomer unit included in the polymer block A is 75 mass % or more, preferably 80 mass % or more, and more preferably 90 mass % or more based on the polymer block A.

The polymer block B included in the component (a) comprises a conjugated diene monomer unit as a main component. The amount of the conjugated diene monomer unit included in the polymer block B is 90 mass % or more, preferably 96 mass % or more, and more preferably 99 mass % or more based on the polymer block B.

The component (b) comprises a polymer block A comprising a vinyl aromatic monomer unit as a main component and a polymer block B comprising a conjugated diene monomer unit as a main component. The polymer block A and the polymer block B included in the component (b) each may be the same as or different from the polymer block A and the polymer block B included in the component (a). The component (b) may comprise one or more polymer blocks A and one or more polymer blocks B.

The content of the polymer block A included in the component (b) is preferably 4 to 16 mass %, more preferably 6 to 14 mass %, and yet more preferably 8 to 12 mass % based on the component (b).

The content of the polymer block B included in the component (b) is preferably 84 to 96 mass %, more preferably 86 to 94 mass %, and yet more preferably 88 to 92 mass % based on the component (b).

The total content of the polymer block A and the polymer block B included in the component (b) is preferably 90 mass % or more, more preferably 95 mass % or more, and yet more preferably 100 mass % based on the component (b).

The polymer block A included in the component (b) comprises a vinyl aromatic monomer unit as a main component. The amount of the vinyl aromatic monomer unit included in the polymer block A is 75 mass % or more, preferably 80 mass % or more, and more preferably 90 mass % or more based on the polymer block A.

The polymer block B included in the component (b) comprises a conjugated diene monomer unit as a main component. The amount of the conjugated diene monomer unit included in the polymer block B is 90 mass % or more, preferably 96 mass % or more, and more preferably 99 mass % or more based on the polymer block B.

Examples of the "vinyl aromatic compound" constituting the "vinyl aromatic monomer unit" include, but are not limited to, styrene, α-methylstyrene, p-methylstyrene, divinylbenzene, 1,1-diphenylethylene, N,N-dimethyl-p-aminoethylstyrene, and N,N-diethyl-p-aminoethylstyrene. Of these, styrene, α-methylstyrene and p-methylstyrene are preferred from the viewpoint of availability and productivity. Of these, styrene is particularly preferred. Only one of these may be used singly, and two or more of these may be used in combination.

The "conjugated diene compound" constituting the "conjugated diene monomer unit" is a diolefin having a pair of conjugated double bonds. Examples of the conjugated diene compound include, but are not limited to, 1,3-butadiene, 2-methyl-1,3-butadiene (isoprene), 2,3-dimethyl-1,3-butadiene, 1,3-pentadiene, 2-methyl-1,3-pentadiene, 1,3-hexadiene, and Farnesene. Examples of preferred diolefins include 1,3-butadiene and isoprene. Only one of these may be used singly, and two or more of these may be used in combination.

The peak top molecular weight of the component (a) is 50,000 to 120,000, preferably 60,000 to 110,000, and more preferably 70,000 to 100,000. When the peak top molecular weight of the component (a) is 50,000 or more, excellent suppression of increase in tackiness and fabricability are provided. When the peak top molecular weight of the component (a) is 120,000 or less, excellent tackiness and fabricability are provided. The peak top molecular weight can be determined by obtaining a molecular weight corresponding to the top of the peak obtained by gel permeation chromatography (GPC) (solvent: tetrahydrofuran, temperature: 40° C.) from a standard polystyrene calibration curve.

The peak top molecular weight of the component (b) is 1.8 times to 3.8 times, preferably 1.9 times to 3.7 times, more preferably 2.0 times to 3.6 times, yet more preferably 2.1 times to 3.5 times the peak top molecular weight of the component (a). When the peak top molecular weight of the component (b) is in the above range, excellent fabricability is provided.

The component (a)/component (b) in terms of mass proportion is preferably 60/40 to 10/90, more preferably 55/45 to 20/80, and yet more preferably 50/50 to 30/70. When the mass proportion of the component (b) is 40 or more, excellent tack strength and suppression of increase in tackiness are provided. When the mass proportion of the component (b) is 90 mass or less, excellent fabricability is provided.

A method for obtaining a hydrogenated copolymer composition comprising the component (a) and the component (b) is not particularly limited. For example, the component (a) and the component (b) are each polymerized and hydrogenated, and the hydrogenated polymers may be solution-blended or dry-blended at an appropriate ratio. From the viewpoint of productivity, it is preferred that the component (a) be polymerized, a portion of the component (a) be subjected to a coupling reaction to form the component (b), a copolymer composition comprising the component (a) and the component (b) be obtained at once, and the composition be hydrogenated.

A coupling agent is not particularly limited as long as the above peak top molecular weights and mass proportions of the component (a) and the component (b) are achieved, and examples of the coupling agent include polyalkenyl coupling agents. Preferred exemplary polyalkenyl coupling agents are divinylbenzenes, and m-divinylbenzene is preferred. Examples of the coupling agent also include tetraalkoxysilanes such as tetraethoxysilane and tetramethoxysilane, alkyltrialkoxysilanes such as methyltrimethoxysilane, dialkyldialkoxysilanes such as dimethyldimethoxysilane, carboxylic acid ester compounds such as ethyl benzoate and methyl benzoate, and glycidyl aromatic epoxy compounds such as a diglycidyl ether derived from a reaction between bisphenol A and epichlorohydrin.

The component (a) and the component (b) are preferably each independently represented by the following formulas.

A1-B1, B2-A1-B1, A1-B1-A2, B2-A1-B1-A2, B2-A1-B1-X, (A1-B1)$_n$X, or (B2-A1-B1)$_n$X:

wherein
- A1 and A2 are each independently a polymer block comprising a vinyl aromatic monomer unit as a main component,
- B1 and B2 are each independently a polymer block comprising a conjugated diene monomer unit as a main component,
- n is an integer of 2 or greater, and
- X is the residue of a coupling agent.

From the viewpoint of tack strength, suppression of increase in tackiness, and fabricability, the component (a) and/or component (b) preferably have a coupling structure. From the viewpoint of satisfying the relation (1) between capillary viscosity and melt flow rate mentioned below and from the viewpoint of highly achieving the balance among tack strength, suppression of increase in tackiness, and fabricability, the component (a) preferably has a structure represented by B2-A1-B1 and/or B2-A1-B1-X, and the component (b) preferably has a structure represented by (B2-A1-B1)$_n$X.

n is preferably an integer of 2 to 4 and more preferably 3 or 4. For example, n can be controlled to 3 or 4 by using tetraethoxysilane as the coupling agent and adjusting the stirring time at a temperature at addition of 100° C. or less under a condition of a stirrer such as a paddle blade.

When the component (a) and/or component (b) include B2, from the viewpoint of fabricability, the content of B2 is preferably 3 to 10 mass % based on the hydrogenated copolymer composition. When the content of B2 is 10% or less, excellent suppression of increase in tackiness tends to be provided.

The content of the vinyl aromatic monomer unit in the hydrogenated copolymer composition of the present embodiment is 5 to 18 mass %, preferably 6 to 17 mass %, and more preferably 8 to 12 mass % based on the composition. When the content of the vinyl aromatic monomer unit is 18 mass % or less, the tackiness and fabricability become better. When the content of the vinyl aromatic monomer unit is 5 mass % or more, the increase in tackiness can be suppressed, and the fabricability also tends to become better.

The content of the vinyl aromatic monomer unit in the hydrogenated copolymer composition of the present embodiment can be measured with an ultraviolet spectrophotometer as described in Examples described below. The content of the vinyl aromatic monomer unit is nearly identical before and after hydrogenation, and therefore the content of the vinyl aromatic monomer unit in the copolymer before hydrogenation may be relied upon.

The content of the vinyl aromatic monomer unit in the hydrogenated copolymer composition can be controlled within the predetermined numeric range by adjusting the amount of the vinyl aromatic compound added in the polymerization step.

The content of the vinyl aromatic monomer block in the hydrogenated copolymer composition based on the content of all the vinyl aromatic monomer units in the hydrogenated copolymer composition is referred to as the "vinyl aromatic monomer block content" or to as simply the "block content". The vinyl aromatic monomer block is a group of three or more sequential vinyl aromatic monomer units, and the signal of the block can be detected by $^1$H-NMR. The block content of the hydrogenated copolymer composition of the present embodiment is 75 mass % or more, preferably 80 mass % or more, and more preferably 90 mass % or more. When the block content is 75 mass % or more, excellent suppression of increase in tackiness and fabricability tend to be provided. The block content can be measured with $^1$H-NMR as described in Examples.

The content of the conjugated diene monomer unit in the hydrogenated copolymer composition of the present embodiment is preferably 82 to 95 mass %, more preferably 83 to 94 mass %, and yet more preferably 88 to 92 mass % based on the composition.

In the hydrogenated copolymer composition of the present embodiment, the conjugated diene monomer unit is incorporated via a binding mode of a 1,2-bond, 3,4-bond, or 1,4-bond in the copolymer. The total proportion of the conjugated diene monomer units incorporated via a binding mode of a 1,2-bond or 3,4-bond is preferably 40 to 70 mol % and more preferably 45 to 65 mol % based on the total of the conjugated diene monomer units incorporated via the binding mode of the 1,2-bond, 3,4-bond, or 1,4-bond. The conjugated diene monomer units incorporated via a binding mode of the 1,2-bond or 3,4-bond each has a vinyl group. Thus, the total proportion of the conjugated diene monomer units incorporated via a binding mode of the 1,2-bond or 3,4-bond is referred to as a "vinyl bond content". When the vinyl bond content is 40 mol % or more, excellent initial tack strength is provided, practically effective tackiness can be developed, and excellent fabricability is provided. When the vinyl bond content is 70 mol % or less, excellent suppression of increase in tackiness tends to be provided.

The vinyl bond content can be controlled by using a Lewis base as a vinylating agent (e.g., an ether or an amine), its amount of use, and the polymerization temperature. The vinyl bond content can be measured by nuclear magnetic resonance spectrum analysis ($^1$H-NMR) or the like. The vinyl bond content may be measured either before or after hydrogenation. Specifically, the vinyl bond content can be measured by the method described in the Examples below.

Double bonds of the conjugated diene monomer units included in the hydrogenated copolymer composition of the present embodiment are hydrogenated. The proportion of the hydrogenated double bonds of the conjugated diene monomer units (hereinafter the "degree of hydrogenation") is 81 mol % or more, preferably 85 mol % or more, and more preferably 90 mol % or more. When the degree of hydrogenation is 81% or more, increase in tackiness can be suppressed, excellent fabricability can be provided, degradation on molding also can be suppressed, and gelling can be suppressed.

The degree of hydrogenation can be controlled by adjusting the amount of catalyst and the amount of hydrogen to be fed during hydrogenation, for example. The hydrogenation speed can be controlled by adjusting the amount of catalyst, the amount of hydrogen to be fed, the pressure and temperature and the like during hydrogenation, for example. The degree of hydrogenation can be measured by the method described in the Examples below.

The melt flow rate (hereinafter, also referred to as "MFR", in accordance with ISO 1133) of the hydrogenated copolymer composition of the present embodiment is 4 to 20 g/10 min, preferably 5 to 18 g/10 min, and yet more preferably 6 to 16 g/10 min under conditions of a temperature of 230° C. and a load of 2.16 kg. When the MFR is 20 g/10 min or less, an excellent balance between the tack strength and the suppression of increase in tackiness is provided. When the MFR is 4 g/10 min or more, excellent fabricability is provided.

The MFR of the hydrogenated copolymer composition can be controlled by adjusting the polymerization conditions such as the amount of monomer added, polymerization time, temperature, and polymerization initiator and can be measured by a method described in Examples described below.

The capillary rheometer measurement viscosity (hereinafter, also referred to as the "capillary viscosity") of the hydrogenated copolymer composition of the present embodiment is 300 to 600 Pa·s, preferably 350 to 580 Pa·s, and yet more preferably 370 to 560 Pa·s under conditions of a temperature of 230° C. and a shear rate of 121.6 sec$^{-1}$. This capillary viscosity is a value obtained by measurement in compliance with ISO11443, but is a so-called "apparent viscosity", which has not been subjected to the Bagley correction or the Rabinovitch correction. Since the measurement value greatly depends on measurement apparatus conditions, the measurement apparatus conditions are specified as follows. The accuracy of the numerical values below and conditions not specified below are compliant to ISO 11443.

Capillary die inner diameter: ϕ1.0 mm
Capillary die length: 10.0 mm
Inlet angle: 180°
Piston diameter: ϕ9.510 mm
Furnace body diameter: ϕ9.55 mm When the capillary viscosity is 600 Pa·s or less, excellent fabricability is provided. When the capillary viscosity is 300 Pa·s or more, an excellent balance between the tack strength and the suppression of increase in tackiness is provided.

The capillary viscosity of the hydrogenated copolymer composition can be controlled by adjusting the polymerization conditions such as the amount of monomer added, polymerization time, temperature, and polymerization initiator and can be measured by a method described in Examples described below.

The capillary viscosity (C) and the MFR (M) of the hydrogenated copolymer composition of the present embodiment satisfy the relationship of the following expression (1):

$$C \leq -20.8M + 754.2 \qquad \text{(Expression 1)}.$$

The expression (1) is derived as a result of a detailed investigation on the relationship between the capillary viscosity and MFR and the fabricability of a plurality of hydrogenated copolymer compositions. Both the MFR and the capillary viscosity are indicators of the viscosity and naturally correlated with each other. While the MFR reflects low shearing, the capillary viscosity is considered to reflect a viscosity at high shearing with the conditions set constant (temperature: 230° C., shear rate: 121.6 sec$^{-1}$). In the present invention, with attention focused on the fact that high shearing is imparted during fabrication of the composition, it is considered that lowering the capillary viscosity may suppress the uneven thicknesses due to fabrication. Meanwhile, the environment to be used after film molding is close to the conditions under which low shearing is provided, and it is considered that, with a lower MFR, the tack strength is higher and the increase in tackiness is more unlikely to occur. Satisfying the relationship of the expression (1) means that the capillary viscosity, which is a dynamic viscosity indicator, is a low value which may not be provided by conventional design, with respect to the MFR, which is a static viscosity indicator. Simultaneously achieving the MFR and the relationship of the expression (1) allows the viscosities at low shearing and high shearing to satisfy preferred ranges as described above. Thus, the fabricability of the hydrogenated copolymer composition and the balance between the tack strength and the suppression of increase in tackiness of the adhesive film are excellent. Specifically, for example, in coextrusion molding using a film extruder, uneven thicknesses are unlikely occur in the tacky layer, and the tack strength and the suppression of increase in tackiness of the adhesive film are well-balanced.

In order to satisfy the above expression (1), it is necessary to have a specific polymer structure, and it is necessary to fulfill the following requirements:

a hydrogenated copolymer composition comprises
a component (a) comprising a polymer block comprising a vinyl aromatic monomer unit as a main component and a polymer block comprising a conjugated diene monomer unit as a main component, and
a component (b) comprising a polymer block comprising a vinyl aromatic monomer unit as a main component and a polymer block comprising a conjugated diene monomer unit as a main component, wherein
the component (a) has a peak top molecular weight of 50,000 to 120,000,
the component (b) has a peak top molecular weight 1.8 times to 3.8 times the peak top molecular weight of the component (a),
81 mol % or more of the double bonds of the conjugated diene monomer unit included in the hydrogenated copolymer composition is hydrogenated, and
the content of the vinyl aromatic monomer unit included in the hydrogenated copolymer composition is 5 to 18 mass % based on the composition,
the block content of the vinyl aromatic monomer unit included in the hydrogenated copolymer composition is 75 mass % or more. However, a polymer only satisfying the above requirements cannot achieve a gap between the viscosities at high shearing and at low shearing if the polymer has a conventionally common structure. Thus, a specific structure is preferably designed from the following viewpoints.

Design Example 1

A plurality of vinyl aromatic monomer blocks is provided in the molecule within the range of the vinyl aromatic monomer amount, and the chain length of the vinyl aromatic monomer blocks is changed.

Thereby, a vinyl aromatic monomer block (large) and a vinyl aromatic monomer block (small) may be formed in one identical molecular chain. The vinyl aromatic monomer block (small) has a large contribution to the viscosity at low shearing as in MFR measurement, and thus, the viscosity is kept high. In contrast, the vinyl aromatic monomer block (small) has a relatively smaller influence on the viscosity at high shearing as the capillary viscosity, and thus, the viscosity becomes lower. Consequently, it can be expected that only the capillary viscosity will be lowered while MFR is maintained.

The styrene block (large) is preferably set to have a molecular weight of about 10,000 to 20,000 which is also 5 times to 10 times the molecular weight of the styrene block (small), although depending on the molecular weight, the degree of hydrogenation, and the like.

Design Example 2

Mixed are two or more polymers in which the size of the vinyl aromatic monomer block is different among different molecules (the vinyl aromatic monomer blocks in one identical molecular chain have the same size).

As in Design Example 1, an effect in that the viscosity at high shearing is different from the viscosity at low shearing is expected due to the influence of the vinyl aromatic monomer blocks each having a different size.

Design Example 3

A special functional group that allows a molecular chain to be once dissociated (cleaved) under high shearing conditions as the capillary viscosity and then to be restored is introduced into the molecular chain. Thereby, there can be expected an effect of lowering only the viscosity at high shearing while the viscosity at low shearing is maintained. Examples of a functional group that may exert this effect include a non-covalent functional group such as a hydroxyl group, an amino group, a carboxyl group, an amide group, a urea group, an imide group, and a guanidino group.

If the tacky layer has uneven thicknesses, the tack strength is affected because the ratio of the layer thickness with respect to the substrate layer changes to thereby lead to a change in a stress applied on a peel portion during peeling. Similarly, the change in the ratio of the layer thickness with respect to the substrate layer also leads to a change in the strength of the substrate layer portion for retaining the tacky layer, and thus, the increase in tackiness is affected. In addition, zipping, an adhesive residue, and lifting of the film are affected for the similar reasons.

[Method for Producing Hydrogenated Copolymer Composition]

The hydrogenated copolymer composition of the present embodiment can be produced, for example, by carrying out polymerization in an organic solvent with an organic alkali metal compound as the polymerization initiator to obtain a copolymer and then subjecting the copolymer to hydrogenation.

The polymerization form may be batch polymerization or continuous polymerization, or may be a combination thereof. From the viewpoint of obtaining a copolymer having a narrow molecular weight distribution, a batch polymerization method is preferred.

The polymerization temperature is generally 0 to 150° C., preferably 20 to 120° C., more preferably 40 to 100° C., and even more preferably 40 to 80° C.

The polymerization time depends on the polymer intended, and is usually with 24 hours and preferably 0.1 to 10 hours. From the viewpoint of obtaining a copolymer having a narrow molecular weight distribution and high strength, the polymerization time is more preferably 0.5 to 3 hours.

The atmosphere of the polymerization system, which is not particularly limited, is only required to be in a pressure range sufficient maintaining nitrogen and the solvent in a liquid phase.

The polymerization system preferably includes no impurities such as water, oxygen and carbon dioxide, which may deactivate the polymerization initiator and the living polymer.

Examples of the organic solvent include, but are not particularly limited to, aliphatic hydrocarbons, such as n-butane, isobutane, n-pentane, n-hexane, n-heptane, and n-octane; alicyclic hydrocarbons, such as cyclohexane, cycloheptane, and methylcyclopentane; and aromatic hydrocarbons, such as benzene, xylene, toluene, and ethylbenzene.

The organic alkali metal compound as the polymerization initiator is preferably an organic lithium compound.

As the organic lithium compound, organic monolithium compounds, organic dilithium compounds, and organic polylithium compounds can be used. Examples of the organic lithium compound include, but are not limited to, ethyllithium, n-propyllithium, isopropyllithium, n-butyllithium, sec-butyllithium, t-butyllithium, phenyllithium, hexametylenedilithium, butadienyllithium, and isoprope- nyldilithium. Of these, from the viewpoint of polymerization activity, n-butyllithium and sec-butyllithium are preferred.

The amount of the organic alkali metal compound used as the polymerization initiator depends on the molecular weight of the polymer intended, and is generally in the range of 0.01 to 0.5 phm (parts by mass per 100 parts by mass of the monomer), preferably in the range of 0.03 to 0.3 phm, and more preferably in the range of 0.05 to 0.15 phm.

The total amount of the 1,2-bonds and 1,4-bonds of the conjugated diene monomer unit in the hydrogenated copolymer composition can be controlled by using a Lewis base (e.g., an ether or an amine) as a vinylating agent. The amount of the vinylating agent used is adjusted in accordance with the amount of vinyl bonds intended. Alternatively, adding the vinylating agent and a metal alkoxide described below separately under two or more conditions can produce a polymer having a different amount of vinyl bonds in a polymer comprising a conjugated diene monomer unit as a main component.

Examples of the vinylating agent include, but are not limited to, ether compounds, etheric compounds having two or more oxygen atoms, and tertiary amine compounds.

Examples of the tertiary amine compound include, but are not limited to, pyridine, N,N,N',N'-tetramethylethylenediamine, tributylamine, tetramethylpropanediamine, 1,2-dipiperidinoethane, and bis[2-(N,N-dimethylamino)ethyl]ether. Only one of these may be used singly, and two or more of these may be used in combination.

Preferable tertiary amine compounds are compounds having two amines. Furthermore, of these, compounds having a structure showing symmetry in the molecule are more preferable, and N,N,N',N'-tetramethylethylenediamine, bis[2-(N,N-dimethylamino)ethyl]ether, and 1,2-dipiperidinoethane are even more preferable.

In the production step for the hydrogenated copolymer composition of the present embodiment, polymerization may be performed under coexistence of the vinylating agent, organic lithium compound, and alkali metal alkoxide aforementioned. The alkali metal alkoxide herein is a compound represented by the general formula MOR, wherein M is an alkali metal, and R is an alkyl group.

The alkali metal of the alkali metal alkoxide is preferably sodium or potassium from the viewpoint of a high amount of vinyl bond, a narrow molecular weight distribution, a high polymerization speed, and a high block content.

The alkali metal alkoxide is, but are not limited to, preferably a sodium alkoxide, lithium alkoxide, or potassium alkoxide having an alkyl group having 2 to 12 carbon atoms, more preferably a sodium alkoxide or potassium alkoxide having 3 to 6 carbon atoms, and even more preferably sodium-t-butoxide, sodium-t-pentoxide, potassium-t-butoxide, or potassium-t-pentoxide.

Of these, sodium alkoxides such as sodium-t-butoxide and sodium-t-pentoxide are still even more preferable.

In the production step of the hydrogenated copolymer composition of the present embodiment, when polymerization is performed under coexistence of a vinylating agent, an organic lithium compound, and an alkali metal alkoxide, the components preferably coexist in the molar ratio of the vinylating agent to the organic lithium compound (vinylating agent/organic lithium compound) and the molar ratio of the alkali metal alkoxide to the organic lithium compound (alkali metal alkoxide/organic lithium compound) described below:

vinylating agent/organic lithium compound: 0.2 to less than 3.0 alkali metal alkoxide/organic lithium compound: 0.3 or less

The molar ratio of vinylating agent/organic lithium compound in the polymerization step is more preferably 0.5 or more from the viewpoint of the high amount of vinyl bonds, and high polymerization speed and is preferably 2.5 or less and more preferably 0.8 or more and 2.0 or less from the viewpoint of the narrow molecular weight distribution and high hydrogenation activity.

The molar ratio of alkali metal alkoxide/organic lithium compound is more preferably 0.2 or less, even more preferably 0.1 or less, and even more preferably 0.08 or less from the viewpoint of the narrow molecular weight distribution and high hydrogenation activity.

Furthermore, the molar ratio of alkali metal alkoxide/vinylating agent is more preferably 0.1 or less, even more preferably 0.08 or less, still even more preferably 0.06 or less, still even more preferably 0.05 or less from the viewpoint of achieving a narrow molecular weight distribution and obtaining high hydrogenation activity.

When a polymer comprising a conjugated diene monomer unit as a main component is contained in the hydrogenated copolymer composition of the present embodiment, an example of an approach to produce a polymer having a different amount of vinyl bonds in the polymer comprising a conjugated diene monomer unit as a main component is a method including use of a deactivator for the vinylating agent.

Examples of the deactivator include, but are not limited to alkyl metal compounds, and the deactivator is selected from alkyl aluminum, alkyl zinc, and alkyl magnesium having 1 to 20 carbon atoms per alkyl substituent, and mixtures thereof.

In the production step of the hydrogenated copolymer composition of the present embodiment, the hydrogenation method is not particularly limited. For example, hydrogenating a copolymer obtained as described above by supplying hydrogen in the presence of a hydrogenation catalyst can provide a hydrogenated copolymer in which the double bond residues of the conjugated diene monomer unit have been hydrogenated.

Additionally, pelletizing the hydrogenated copolymer composition obtained as described above can produce pellets of the hydrogenated copolymer composition.

Examples the pelletizing method include a method including extruding the hydrogenated copolymer in a strand form from a single screw or twin screw extruder and cutting the extruded product in water with a rotary blade installed at the front face of a die portion; a method including extruding the hydrogenated copolymer composition in a strand form from a single screw or twin screw extruder and cutting the extruded product with a strand cutter after water cooling or air cooling; and a method including shaping the hydrogenated copolymer or the hydrogenated copolymer composition into a sheet form with a roll after melt blending with an open roll and a Banbury mixer, further, cutting the sheet into strips, and thereafter cutting the strips into cuboidal pellets with a pelletizer.

It is to be noted that the size and shape of a pellet molded article of the hydrogenated copolymer composition are not particularly limited.

An antiblocking agent for pellets can be blended as necessary in the hydrogenated copolymer composition of the present embodiment in the pellet thereof, as required, in order to prevent blocking of pellets.

Examples of the antiblocking agent for pellets include, but not limited to, calcium stearate, magnesium stearate, zinc stearate, polyethylene, polypropylene, ethylenebis(stearylamide), talc, and amorphous silica.

From the viewpoint of the tackiness of an adhesive film obtained by molding the hydrogenated copolymer composition, the antiblocking agent for pellets is preferably polyethylene, ethylenebis(stearylamide), or calcium stearate.

The amount of the antiblocking agent for pellets blended is preferably 500 to 10,000 ppm with respect to the hydrogenated copolymer composition and more preferably 1,000 to 7,000 ppm with respect to the hydrogenated copolymer composition. Although the antiblocking agent for pellets is preferably blended while being attached to the surface of the pellets, a portion of the agent may be contained inside the pellets.

[Adhesive Material Composition]

The adhesive material composition of the present embodiment comprises the hydrogenated copolymer composition of the present embodiment.

The adhesive material composition of the present embodiment may comprise a tackifier.

The tackifier is not particularly limited as long as it is a resin that is capable of imparting viscosity to the adhesive material composition of the present embodiment, and examples include known tackifiers such as rosin terpene resins, hydrogenated rosin terpene resins, cumarone resins, terpene resins, hydrogenated terpene resins, phenol resins, terpene-phenol resins, aromatic hydrocarbon resins, and aliphatic hydrocarbon resins.

Only one tackifier may be used singly, or two or more these may be used as a mixture.

Specific examples of usable tackifiers are those described in "Chemicals for Rubber/Plastics" (by Rubber Digest, Co., Ltd., Japan). Use of a tackifier can improve the tack strength.

The content of the tackifier in the adhesive material composition of the present embodiment is preferably 100 parts by mass or less, more preferably 80 parts by mass or less, and even more preferably 60 parts by mass or less, based on the total mass of the hydrogenated copolymer composition being 100 parts by mass.

When the tackifier content is 100 parts by mass or less, there is a tendency that increase in tackiness can be effectively suppressed, and therefore such a tackifier content is preferable.

The adhesive material composition of the present embodiment may further comprise a hydrogenated styrenic elastomer having a structure different from that of the above-described hydrogenated copolymer composition of the present embodiment.

The hydrogenated styrene elastomer is not limited to the following, and examples of typical hydrogenated styrenic elastomers include styrene-butadiene-styrene (SBS), styrene-ethylene-butylene-styrene (SEBS) obtained by saturating styrene-isoprene-styrene by hydrogenation, and styrene-ethylene-propylene-styrene (SEPS).

Additional examples include elastomers of such a structure as styrene-ethylene-butylene (SEB) or styrene-ethylene-propylene (SEP).

Moreover, reactive elastomers may be used, which are obtained by adding a variety of functional groups to the above hydrogenated styrenic elastomers.

Examples of the functional group include, but are not limited to, a hydroxyl group, a carboxyl group, a carbonyl group, a thiocarbonyl group, an acid halide group, an acid anhydride group, a thiocarboxylic acid group, an aldehyde group, a thioaldehyde group, a carboxylic acid ester group, an amide group, a sulfonic acid group, a sulfonic acid ester group, a phosphoric acid group, a phosphoric acid ester group, an amino group, an imino group, a nitrile group, a pyridyl group, a quinoline group, an epoxy group, a thioepoxy group, a sulfide group, an isocyanate group, an isothiocyanate group, a silicon halide group, an alkoxy silicon group, a tin halide group, a boronic acid group, a boron-containing group, a boronic acid salt group, an alkoxy tin group, and a phenyl tin group.

The adhesive material composition of the present embodiment may further comprise an ethylene vinyl acetate copolymer.

The ethylene vinyl acetate copolymer can be produced, for example, by subjecting ethylene and vinyl acetate to radical copolymerization under high-temperature, high-pressure conditions, but the production method is not particularly limited. Although the properties of the ethylene vinyl acetate copolymer depend on the vinyl acetate content, the vinyl acetate content is not particularly limited.

The adhesive material composition of the present embodiment may further comprise an acrylic copolymer.

Examples of the acrylic copolymer include, but are not particularly limited to, copolymers of methyl acrylate, ethyl acrylate, methyl methacrylate, acrylnitrile, and the like with vinyl acetate, vinyl chloride, styrene, and the like.

The adhesive material composition of the present embodiment may further comprise a softening agent.

Examples of the softening agent include, but are not limited to, mineral-oil softening agents and synthetic-resin softening agents.

In general, examples of mineral-oil softening agents include mixtures of aromatic hydrocarbons, naphthenic hydrocarbons, and paraffinic hydrocarbons. Oils in which carbon atoms of paraffinic hydrocarbons account for 50% or more of all carbon atoms are referred to as paraffinic oils, oils in which carbon atoms of naphthenic hydrocarbons account for 30 to 45% are referred to as naphthenic oils, and oils in which carbon atoms of aromatic hydrocarbons account for 35% or more are referred to as aromatic oils.

Paraffinic oils, which are softening agents for rubbers, are preferable as mineral-oil softening agents, and polybutene, low molecular weight polybutadiene, and the like are preferable as synthetic-resin softening agents.

When a softening agent is contained, the adhesive material composition of the present embodiment tends to have more improved tackiness.

From the viewpoint of suppressing the bleeding of a softening agent and ensuring practically sufficient tack strength in the adhesive material composition of the present embodiment, the softening agent content in the adhesive material composition of the present embodiment is preferably 100 parts by mass or less and more preferably 80 parts by mass or less based on the mass of the hydrogenated copolymer composition of the present embodiment being 100 parts by mass.

Furthermore, a stabilizer such as an antioxidant, a light stabilizer, or the like may be added to the adhesive material composition of the present embodiment.

Examples of the antioxidant include, but are not limited to, hindered phenol antioxidants such as 2,6-di-t-butyl-4-methylphenol, n-octadecyl-3-(4'-hydroxy-3',5'-di-t-butylphenyl)propionate, 2,2'-methylenebis(4-methyl-6-t-butylphenol), 2,2'-methylenebis(4-ethyl-6-t-butylphenol), 2,4-bis[(octylthio)methyl]-o-cresol, 2-t-butyl-6-(3-t-butyl-2-hydroxy-5-methylbenzyl)-4-methylphenyl acrylate, 2,4-di-t-amyl-6-[1-(3,5-di-t-amyl-2-hydroxyphenyl)ethyl]phenyl acrylate, and 2-[1-(2-hydroxy-3,5-di-tert-pentylphenyl)]acrylate; sulfur antioxidants such as dilauryl thiodipropionate and lauryl stearyl thiodipropionate pentaerythritoltetrakis(β-lauryl thiopropionate); and phosphorus antioxidants such as tris(nonylphenyl) phosphite and tris(2,4-di-t-butylphenyl) phosphite.

Examples of the light stabilizer include, but are not limited to, benzotriazole ultraviolet absorbers such as 2-(2'-hydroxy-5'-methylphenyl)benzotriazole, 2-(2'-hydroxy-3',5'-t-butylphenyl)benzotriazole, and 2-(2'-hydroxy-3',5'-di-t-butylphenyl)-5-chlorobenzotriazole; benzophenone ultraviolet absorbers such as 2-hydroxy-4-methoxybenzophenone; and hindered amine light stabilizers.

In addition to the above-described various materials, various additives may be added to the adhesive material composition of the present embodiment as necessary.

Examples of such additives include, but are not limited to, pigments such as iron red and titanium dioxide; waxes such as paraffin wax, microcrystalline wax, and low molecular weight polyethylene wax; polyolefin or low molecular weight vinylaromatic thermoplastic resins such as amorphous polyolefin and ethylene ethyl acrylate copolymers; natural rubbers; and synthetic rubbers such as polyisoprene rubber, polybutadiene rubber, styrene-butadiene rubber, ethylene-propylene rubber, chloroprene rubber, acrylic rubber, isoprene-isobutylene rubber, and polypentenamer rubber.

Specific examples of the synthetic rubbers include those described in "Chemicals for Rubber/Plastics" (by Rubber Digest, Co., Ltd., Japan) and the like.

(Production Method for Adhesive Material Composition)

The method for producing the adhesive material composition of the present embodiment is not particularly limited, and the adhesive material composition can be produced by conventionally known methods.

Examples of the method for producing the adhesive material composition include melt kneading methods involving a commonly used mixer such as a Banbury mixer, a single screw extruder, a twin screw extruder, a co-kneader, or a multiscrew extruder; and methods in which components are dissolved or dispersion-mixed, then applied to a predetermined substrate film with a coater or the like, and heated to remove the solvent.

Foaming treatment may be performed on the adhesive material composition of the present embodiment to reduce weight, provide flexibility, and improve adhesion.

Examples of foaming treatment methods include, but are not limited to, chemical methods, physical methods, the use of thermally expandable microballoons, and the like. Such methods can each distribute voids in a material, for example, by adding a chemical blowing agent, such as an inorganic blowing agent or an organic blowing agent, or a physical blowing agent or by adding thermally expandable microballoons. Moreover, a hollow filler (expanded balloons) may also be added to reduce weight, provide flexibility, and improve adhesion.

[Adhesive Film]

The adhesive film of the present embodiment comprises the hydrogenated copolymer composition or the adhesive material composition of the present embodiment.

The adhesive film of the present embodiment is preferably configured to include a tacky layer formed by laminating the hydrogenated copolymer composition or the adhesive material composition described in the above embodiment on a predetermined substrate film.

The material of the substrate film are not particularly limited, and any non-polar resins and polar resins can be used. In terms of performance, cost, etc., polyethylene and homo- or block-polypropylene are preferable non-polar resins, and polyester resins such as polyethylene terephthalate and polybutylene terephthalate, polyamide resins, ethylene-vinylacetate copolymers, hydrolysates thereof, and the like are preferable polar resins.

When the adhesive film of the present embodiment is configured to include a tacky layer on a predetermined substrate film, the thickness of the tacky layer is preferably 1.0 μm or more and 100 μm or less and more preferably 2.0 μm or more and 100 μm or less.

When the thickness of the tacky layer is 100 μm or less, the surface protection film tends to have better handleability, and is economically preferable as well. Moreover, when the thickness is 1 μm or more, there is a tendency that the surface protection film has better adhesion and uniform thickness is likely to be obtained.

The thickness of the substrate film is preferably 5.0 mm or less, more preferably 3.0 mm or less, even more preferably 1.0 mm or less, even more preferably 300 μm or less, and yet more preferably 10 μm or more and 200 μm or less. A film having a thickness of more than 300 μm is generally referred to as a "sheet", and such a sheet is collectively referred to as a film herein.

[Method for Producing Adhesive Film]

Examples of the method for producing the adhesive film of the present embodiment include, but are not limited to, a method in which a solution or a melt of the hydrogenated copolymer composition or the adhesive material composition of the present embodiment is applied onto the predetermined substrate film, and a method including coextruding a substrate layer and a tacky layer using a film extruder.

In the case of using the adhesive material composition of the present embodiment, a solution or melt of the composition may be used singly, or a solution or melt of the hydrogenated copolymer composition may be mixed thereto.

Although the method in which a solution the hydrogenated copolymer composition or adhesive material composition of the present embodiment is applied is not limited to the following, the adhesive film can be produced, for example, by dissolving the copolymer composition or composition in a solvent capable of dissolving these, applying the solution to a substrate film with a coater or the like, and thermally drying the solvent.

Although the method in which the hydrogenated copolymer composition or the adhesive material composition of the present embodiment is melted and applied is not limited to the following, the adhesive film can be produced, for example, by applying the molten hydrogenated copolymer composition or adhesive material composition of the present embodiment onto a substrate film with a hot melt coater or the like.

In the case of using this method, a substrate film is preferably used that has a glass transition temperature, melting point, or softening point higher than the coating temperature.

Although the method in which a film extruder is used is not limited to the following, the adhesive film can be produced, for example, in such a manner that the components of the adhesive layer containing the hydrogenated copolymer composition or the adhesive material composition of the present embodiment and the components such as a thermoplastic resin that can constitute the substrate film layer are formed into two streams in a melt coextruder, or that is to say, a fluid for forming the tacky layer and a fluid for forming the substrate film are merged in a dice port and formed into a single fluid and extruded to combine the tacky layer and the resin film layer.

In the case of applying the method in which a film extruder is used, the adhesive material composition of the present embodiment can be produced also by dry-blending the components of the hydrogenated copolymer composition and the adhesive material composition in advance. Thus, the method is excellent in productivity. Moreover, when the adhesive film is produced by extrusion molding, the adhesive film tends to have particularly remarkable adhesion and tackiness.

[Resin Composition]

In the fields of automotive members such as exterior materials and interior surface materials, medical members such as infusion bags and infusion tubes, and packaging for food and clothing, examples of properties required for a resin composition including a thermoplastic resin such as polypropylene include tensile elongation at break, impact resistance at low temperatures, low mold shrinkability, and the balance among the properties. Generally, when a resin composition is molded, residual strain is generated, and the strain is released or the like over time to thereby cause a change in the dimensions. The low mold shrinkability means that the change is small. A resin composition containing the hydrogenated copolymer composition of the present embodiment and a polypropylene resin tends to be excellent in tensile elongation at break, impact resistance at low temperatures, and low mold shrinkability.

(Polypropylene Resin)

Random polypropylene and block polypropylene can be used as the polypropylene resin in addition to homopolypropylene.

"Random" in the random polypropylene means that, in a copolymer of propylene with a monomer other than propylene, the monomer other than propylene is randomly incorporated into the propylene chain and units of the monomer other than propylene are not substantially linked to one another.

The random polypropylene is not particularly limited as long as the content of the propylene units is less than 99 mass %.

Examples of the random polypropylene include a random copolymer of propylene and ethylene, or a random copolymer of propylene and an α-olefin having 4 to 20 carbon atoms.

Examples of the α-olefin include, but are not limited to, ethylene, 1-butene, 1-pentene, 3-methyl-1-butene, 1-hexene, 3-methyl-1-pentene, 4-methyl-1-pentene, 1-heptene, 1-octene, 1-nonene, 1-decene, 1-dodecene, 1-tetradecene, 1-hexadecene, 1-octadecene, and 1-eicosene. Preferred is an α-olefin having 2 to 8 carbon atoms, and examples thereof include ethylene, 1-butene, 3-methyl-1-butene, 1-hexene, and 4-methyl-1-pentene. One of these α-olefins may be used singly or two or more of these may be used in combination.

Also, one of homopolypropylene and random polypropylene may be used singly or two or more of these may be used in combination.

Only one type of polypropylene may be used, or two or more polypropylene resins may be mixed. In the case of a mixture of two or more polypropylene resins, for example, each ethylene-propylene copolymer is polymerized with homopolypropylene in a separate process, and different solid pellets may be mixed for use.

A method for preparing the polypropylene resin is not particularly limited. The polypropylene resin can be prepared by a known method, for example. A known catalyst, for example, a Ziegler-Natta catalyst or a metallocene catalyst may be used. As the method for preparing the polypropylene resin, for example, various processes may be employed, such as a one stage process or a multistage process. In various processes such as a slurry polymerization method, a gas phase polymerization method, a bulk polymerization method, and solution polymerization, polymerization may be performed to make different polymers and then the polymers may be mixed.

From the viewpoint of the tensile elongation at break, the impact resistance at low temperatures, the low mold shrinkability, and the balance among the properties of the resin composition of the present embodiment, the mass ratio of the content of the polypropylene resin to the content of the hydrogenated copolymer composition, [polypropylene resin/((a)+(b))], is preferably in the range of 98/2 to 5/95, more preferably of 90/10 to 10/90, and even more preferably 85/15 to 15/85.

The content of the polypropylene resin is preferably 5 mass % or more from the viewpoint of the mechanical strength of resin composition of the present embodiment and is preferably 98 mass % or less from the viewpoint of the impact resistance at low temperatures.

The resin composition of the present embodiment may be combined with an ethylene-α-olefin copolymer rubber (olefinic elastomer) in accordance with the performance required. The ethylene-α-olefin copolymer rubber is a copolymer of ethylene and an α-olefin. The ethylene-α-olefin copolymer rubber is not particularly limited, and known one may be used. Examples of copolymer components include ethylene and one or more C3 to C20 α-olefins.

In the present embodiment, a thermoplastic resin other than the polypropylene resin may be used in combination in accordance with the performance required. Specific examples include polyethylene, polystyrene, polyamide, polycyclohexylethane, polyesters such as polyethylene terephthalate, ethylene/styrene interpolymers, syndiotactic polystyrene, and EPDM. One of these may be used singly, and two or more of these may be used in combination.

The resin composition of the present embodiment may be combined with other additives in accordance with the performance required. The additives are not particularly limited, and examples thereof include a slip agent, a flame retardant, a stabilizer, a colorant, a pigment, an antioxidant, an antistatic agent, a dispersant, a flow enhancer, a mold release agent such as a metal salt of stearic acid, a silicone oil, a mineral oil-type softening agent, a synthetic resin-type softening agent, a copper inhibitor, a crosslinking agent, and a nucleating agent.

The resin composition of the present embodiment may be combined with an inorganic filler in accordance with the performance required. The inorganic filler is not particularly limited and may be a known one. Examples thereof include silica, calcium carbonate, magnesium carbonate, magnesium hydroxide, aluminum hydroxide, calcium sulfate, barium sulfate, carbon black, glass fiber, glass beads, a glass balloon, glass flakes, graphite, titanium oxide, potassium titanate whisker, carbon fiber, alumina, kaolin clay, silicic acid, calcium silicate, quartz, mica, talc, clay, zirconia, potassium titanate, alumina, and metal particles.

The shape of the organic filler is not particularly limited and may be a scaly, spherical, particulate, powder, indefinite shape, or the like. One of these may be used singly or two or more of these may be used in combination.

(Method for Producing Resin Composition)

Examples of a method for producing the resin composition of the present embodiment include a method including dry-blending a hydrogenated copolymer, a polypropylene resin, and additionally other components as required in an amount blended in accordance with the properties of each component and a method including preparation with an apparatus for use in mixing of common polymer materials.

Examples of such mixing apparatuses include, but are not limited to, kneading apparatuses such as a Banbury mixer, a Labo Plastomill, a single screw extruder, and a twin-screw extruder. From the viewpoint of productivity and good kneadability, a melt mixing method with an extruder is preferred.

The melt temperature during kneading can be set as appropriate and is usually in the range of 130 to 300° C. and preferably in the range of 150 to 250° C.

[Molded Article]

A molded article of the present embodiment is a molded article of the resin composition of the present embodiment described above.

Examples of the molded article include sheet-like molded articles (sheets, films), tubes, bags, medical molded articles such as medical tubes and medical films, automotive members such as automotive interior surface material, medical infusion bags, and packaging materials such as food packaging materials and clothing packaging materials, but the molded article of the present embodiment is not limited to those described above.

The molded article of the present embodiment can be molded by a method to be described below. The resin composition of the present embodiment can be molded by softening or melting by heat. The resin composition can be molded by using conventional molding techniques including compression molding, injection molding, gas-assisted injection molding, hollow molding, sheet forming, rotational molding, laminating, calendering, vacuum forming, hot forming, and extrusion. One of these molding techniques may be used singly, and two or more of these may be used in combination. Of these, from the viewpoint of productivity, injection molding is preferred.

Meanwhile, for example, a method for molding a tube is not particularly limited. For example, the resin composition of the present embodiment is introduced into an extruder and melted therein, the melt is allowed to pass through a die into a tube form, and this tube form can be water-cooled or air-cooled to thereby provide a tube.

As the extruder, a single screw or multiscrew extruder may be used, or a multilayer tube can be molded by means of multilayer extrusion using a plurality of extruders. Alternatively, a tube can be molded directly from the extruder used in producing the resin composition using the polypropylene resin. The tube as a molded article may be made as a multilayer tube by lamination of other polymers as long as the objects of the present embodiments are not compromised. One of the above other polymers may be used singly, or a combination of two or more of these may be used, in a single layer or in lamination in a multilayer in which the type of polymer may be different in each layer.

In the present embodiment, further, in order to improve the pressure resistance and the like while the flexibility is maintained by suppressing increase in the thickness, braided reinforcing yarn or a spiral reinforcing body can be wound around the tube to produce a pressure-resistant tube (hose). The braided reinforcing yarn is provided inside in the thickness direction or between layers, and vinylon, polyamide, polyester, aramid fiber, carbon fiber, metal wire, and the like may be used as the yarn. The spiral reinforcing body is provided in the periphery, and metal, plastic, and the like may be used as the body.

A method for producing a sheet-like molded article is not particularly limited. Examples of a molding method in which the resin composition is introduced in an extruder and extruded include a T-die method and an inflation method.

Examples of inflation molding that can be employed include usual air-cooled inflation molding, air-cooled two stage inflation molding, high-speed inflation molding, and water-cooled inflation molding.

Additionally, a blow molding method such as direct blowing and injection blowing and a press molding method can be employed.

The sheet-like molded article may be a single layer sheet, or may be a multilayer sheet obtained by lamination of other polymers as long as the gist of the present embodiment is not compromised. Examples of the other polymers include, but are not limited to, an olefinic copolymer such as polypropylene, polyethylene, an ethylene-propylene copolymerized rubber (EPM), and an ethylene-propylene-non-conjugated diene copolymerized rubber (EPDM); a polyester-type polymer such as a polyester elastomer, polyethylene terephthalate, and polybutylene terephthalate; a polyamide-type resin such as polyamide 6, polyamide 6,6, polyamide 6,10, polyamide 11, polyamide 12, and polyamide 6,12; an acrylic resin such as poly(methyl acrylate) and poly(methyl methacrylate); a polyoxymethylene-type resin such as a polyoxymethylene homopolymer and a polyoxymethylene copolymer; a styrenic resin such as a styrene homopolymer, an acrylonitrile-styrene resin, and an acrylonitrile-butadiene-styrene resin; a polycarbonate resin; a styrenic elastomer such as a styrene-butadiene copolymer rubber and a styrene-isoprene copolymer rubber and a hydrogenated product or modified product thereof; a natural rubber; a synthetic isoprene rubber and a liquid polyisoprene rubber and a hydrogenated product or modified product thereof; a chloroprene rubber; an acrylic rubber; a butyl rubber; an acrylonitrile-butadiene rubber; an epichlorohydrin rubber; a silicone rubber; a fluorine rubber; chlorosulfonated polyethylene; a urethane rubber; a polyurethane-type elastomer; a polyamide-type elastomer; a polyester-type elastomer; and a soft vinyl chloride resin. One of the other polymers or a blend of two or more of the other polymers may be used in a single layer or used in lamination in a multilayer in which the type of polymer may be different in each layer.

Coextrusion molding methods such as a multilayer T-die method, a multilayer inflation method, and an extrusion lamination method, common multilayer sheet or film molding methods such as wet lamination, dry lamination, and press molding, and blow molding methods such as multilayer injection blow including coinjection blow and multilayer direct blow may be employed in laminating with other polymers. A multilayer laminate molded may remain unstretched or may be monoaxially or biaxially stretched.

The bag refers to a bag-like molded article that can be formed from the sheet-like molded article. Examples of the bag include a bag for food packaging, a bag for clothing packaging, and a medical bag such as a medical infusion bag and a bag for medicine packaging.

The resin composition of the present embodiment has excellent tensile elongation at break, impact resistance at low temperatures, low mold shrinkability, and the balance among the properties, as shown in Examples described below, and can be used without being particularly limited to applications.

The resin composition can be suitably used, while these properties are made use of, in a wide variety of applications, such as packaging for various clothes, packaging for various foods, packaging for daily miscellaneous goods, packaging for industrial materials, lamination for various rubber products, resin products, leather products, and the like, stretchable tape for use in paper diapers and the like, tacky protective films for use in protecting industrial materials, building materials, and steel sheets such as dicing films, substrate materials for tacky films, sheet materials for trays for meat and fresh fish, plant product packs, frozen food containers, and the like, applications for consumer electrical appliances such as televisions, stereos, and vacuum cleaners, materials for applications for automotive interior and exterior parts such as bumper parts, body panels, side seals, interior (instrument panels, door trims, air bag covers, and the like) surface material, road paving materials, waterproof materials, water barrier sheets, civil engineering packing, daily commodities, leisure equipment, toys, industrial materials, furniture articles, writing instruments, members for drinking water supply, stationery such as transparent pockets, holders, and file spines, and medical articles such as infusion bags.

EXAMPLES

Below, the present embodiment will now be described in detail by way of specific Examples and Comparative Examples, but the present embodiment is not limited to the Examples below.

The methods for measuring and evaluating physical properties applied to the Examples and the Comparative Examples will now be described below.

<Peak Top Molecular Weight>

The peak top molecular weight was measured with GPC [apparatus: manufactured by Waters Corporation].

In the GPC measurement, tetrahydrofuran was used as the solvent, and the temperature was set to 40° C.

In a chromatograph obtained in the GPC measurement, the peak top molecular weight of each of the peak having the highest peak top (referred to as the "first peak") and the peak having the second highest peak top (referred to as the "second peak") was determined using a calibration curve determined from measurement of commercially available standard polystyrene (prepared using the peak molecular weight of the standard polystyrene). Among the first peak and the second peak, the peak having the smaller peak top molecular weight was regarded as the peak corresponding to the component (a), and the peak having the larger peak top molecular weight was regarded as the peak corresponding to the component (b).

<Mass Proportions of Component (a) and Component (b)>

Each of the peaks in the chromatograph obtained in the above GPC measurement was vertically partitioned at an inflection point on the curve between the peaks. The ratio of the area of the first peak and the ratio of the area of the second peak were each determined based on the total area of the peaks. The mass proportions of the component (a) and the component (b) were determined respectively based on the first peak area ratio and the second peak area ratio.

A fitting process based on the Gaussian approximation using EcoSEC waveform separation software was used to partition peaks, and a point of intersection of the peaks was used as the inflection point between the peaks.

<Content of Vinyl Aromatic Monomer Unit of Hydrogenated Copolymer Composition (TS) (Styrene Content)>

A predetermined amount of the hydrogenated copolymer composition was dissolved in chloroform, and the resulting solution was measured with an ultraviolet spectrophotometer (UV-2450, manufactured by Shimadzu Corporation). The content of the vinyl aromatic monomer unit (styrene content) in the hydrogenated copolymer composition was calculated on the basis of the peak strength at the absorption wavelength (262 nm) attributed to the vinyl aromatic compound (styrene), using the calibration curve.

<Vinyl Aromatic Monomer Block Content, Vinyl Bond Content, and Degree of Hydrogenation of Double Bonds Derived from Conjugated Diene Compound in Hydrogenated Copolymer Composition>

The block content, vinyl bond content, and degree of hydrogenation in the hydrogenated copolymer composition were measured with nuclear magnetic resonance analysis (NMR) under the following conditions.

In the measurement, the reaction solution after a hydrogenation reaction was introduced to a large amount of methanol to precipitate the hydrogenated copolymer composition for recovery. Next, the hydrogenated copolymer composition was extracted with acetone, the extracted solution was dried in vacuum, and the resultant was used as a sample for $^1$H-NMR measurement. The conditions for $^1$H-NMR measurement are as follows.

(Measurement Conditions)
   Measurement apparatus: JNM-LA400 (manufactured by JEOL Ltd.)
   Solvent: deuterated chloroform
   Measuring samples: polymer sampled before or after hydrogenation
   Sample concentration: 50 mg/mL
   Observation frequency: 400 MHz
   Chemical shift reference: CDCl3 (deuterated chloroform)
   Pulse delay: 2.904 seconds
   Number of scans: 256
   Pulse width: 45°
   Measurement temperature: 26° C.

<MFR (Melt Flow Rate) of Hydrogenated Copolymer Composition>

The MFR [g/10 min] of the hydrogenated copolymer composition was measured in compliance with ISO 1133 under conditions of a temperature of 230° C. and a load of 2.16 kg.

<Capillary Viscosity of Hydrogenated Copolymer Composition>

The hydrogenated copolymer composition was continuously measured using a capillary rheometer (manufactured by Toyo Seiki Seisaku-sho, Ltd., trade name: CAPILOGRAPH 1D, model: PM-C) under conditions of a temperature of 230° C. and a shear rate of 12.2 sec$^{-1}$ to 12160 sec$^{-1}$, and the value at 121.6 sec$^{-1}$ was determined. The value was expressed in Pa·s.

<Initial Tackiness, Increase in Tackiness>

A universal tension and compression tester "Techno Graph TGE-500N: manufactured by Minebea Co., Ltd." was used as a measurement apparatus for the tack strength.

An adhesive film prepared as described below and cut to have a width of 25 mm was attached to a PMMA plate (arithmetic mean surface roughness: 0.1 µm) at a temperature of 23° C. and 50% RH, additionally adhered by rolling a 2 kg rubber roller (a diameter of 10 cm), left to stand for 30 minutes, and then peeled off at a rate of 300 mm/min to measure tack strength.

A "180° peel test" was performed at a temperature of 23° C. and 50% RH to evaluate both initial tackiness and increase in tackiness.

As the initial tackiness, the initial tack strength was measured. For increase in tackiness, the prepared adhesive film was attached in the above-described manner, then heated at 80° C. for 1 hour in a gear oven for tack promotion, and left to stand for 30 minutes in the measurement environment. Thereafter, the tack strength was measured in accordance with the above-described manner. The initial tackiness and the increase in tackiness were each evaluated in accordance with the following criteria. The "180 peel test" was performed in accordance with the JIS 20237 standard. The evaluation results of the initial tackiness and increase in tackiness are shown in Tables 2 and 4 below.

Initial Tackiness
   ○: Tack strength of 400 g or more/25 mm
   Δ: Tack strength of 300 or more and less than 400 g/25 mm
   X: Tack strength of 0 or more and less than 300 g/25 mm Increase in Tackiness
   ○: Tack strength of 1.5 times or less the initial tack strength
   Δ: Tack strength of more than 1.5 times and 2.0 times or less the initial tack strength
   X: Tack strength of more than 2.0 times the initial tack strength <Fabricability>

The thickness of the tacky layer was measured to determine the uneven thicknesses during molding. A sample for thickness measurement was cut out from a coextrudate [sample width (TD direction): 50 cm, sample length (MD direction): 2 m, substrate layer thickness: 50 µm, tacky layer thickness: 8 µm] with a single-edged razor blade. Specifically, at three points, that is, a point at the center of a coextrudate and points at a 5-cm distance from each end of the coextrudate in the TD direction, six portions were cut out at an equal interval in the MD direction to prepare 18 samples in total. The cross section in the MD direction of the samples was measured with a microscope "VHX-2000: KEYENCE CORPORATION" to determine the standard deviation of the tacky layer thickness.

○: The standard deviation of the tacky layer thickness is 2.0 µm or less.
   Δ: The standard deviation of the tacky layer thickness is more than 2.0 and 4.0 µm or less.
   X: The standard deviation of the tacky layer thickness is more than 4.0 µm.

<Coefficient of Variation of Initial Tack Strength>

Each of the samples of which thickness was measured in the above <Fabricability> evaluation was attached to a PMMA plate (arithmetic mean surface roughness: 0.1 µm) at a temperature of 23° C. and 50% RH, additionally adhered by rolling a 2 kg rubber roller (a diameter of 10 cm), left to stand for 30 minutes, and then peeled off at a rate of 300 mm/min to measure the tack strength. The standard deviation in the tack strength was determined, and then the coefficient of variation was determined.

○: The coefficient of variation of the tack strength is less than 0.01.
   Δ: The coefficient of variation of the tack strength is 0.01 or more and less than 0.05.
   X: The coefficient of variation of the tack strength is 0.05 or more.

[Production of Polypropylene Resin Composition]

The ingredients based on the blending proportion (parts by mass) shown in Table 5 were melt and kneaded with a twin screw extruder ("TEX-30αII" manufactured by The Japan Steel Works, Ltd., cylinder bore diameter: 30 mm) at a temperature set at 220° C. to thereby obtain pellets of the polypropylene resin composition.

<Injection Molding Plate>

The pellets were molded at an injection molding temperature of 220° C. and a mold temperature of 40° C. to obtain a molded article of the polypropylene resin composition (thickness: 2.0 mm). As the polypropylene resin, PM970A (PP/manufactured by SunAllomer Ltd.; MFR=30, block polypropylene) was used, and as the inorganic filler, P-3 (manufactured by Nippon Talc Co., Ltd.) was used.

(Evaluation of Physical Properties of Polypropylene Resin Composition)

<Low Temperature Tensile Elongation (−30° C.)>

A tensile test was performed as follows in compliance with JIS K6251 using a tensile tester equipped with a thermostat chamber (Minebea Co., Ltd., Tg-5kN) at −30° C., with a No. 3 dumbbell, and at a cross head speed of 500 mm/min, and the elongation at break was evaluated.

3: The elongation at break is 500% or more.
2: The elongation at break is 300% or more or more and less than 500%
1: The elongation at break is less than 300%.

<Impact Resistance at Low Temperatures (−30° C.)>

The impact resistance at low temperatures was evaluated in compliance with ISO 179-1.

3: The Charpy impact strength is 8 kJ/m$^2$ or more.
2: The Charpy impact strength is 3 kJ/m$^2$ or more and less than 8 kJ/m$^2$.
1: The Charpy impact strength is less than 3 kJ/m$^2$.

<Mold Shrinkability>

The mold shrinkability was evaluated in compliance with ISO 294-4.

3: The shrinkability is less than 0.4%.
2: The shrinkability is 0.4% or more and less than 0.8%.
1: The shrinkability is 0.8% or more.

[Production of Hydrogenated Copolymer Composition]

(Preparation of Hydrogenation Catalyst)

The hydrogenation catalyst used for the hydrogenation reaction of the hydrogenated copolymer composition was prepared in the following manner.

A nitrogen-purged reaction vessel was charged with 1 liter of dried and purified cyclohexane, 100 mmol of bis(η5-cyclopentadienyl)titanium dichloride was added, and an n-hexane solution containing 200 mmol of trimethylaluminum was added with sufficient stirring, a reaction was performed at room temperature for about 3 days to prepare a hydrogenation catalyst.

(Production of Polymer)

A1, A2, B1, and B2 described below respectively represent the following polymer blocks.

A1, A2: polymer blocks comprising styrene as a main component

B1, B2: polymer blocks comprising butadiene as a main component

Production Example 1

<Polymer 1: Hydrogenated Product of Butadiene-Styrene-Butadiene (B2-A1-B1)>

Batch polymerization was performed in the following manner with a stirred jacketed tank reactor (internal volume: 100 L).

(First Step)

The reactor was charged with a cyclohexane solution containing 38 L of cyclohexane and 3.0 parts by mass of a butadiene monomer (butadiene monomer concentration: 40 mass %), and 0.8 mol of N,N,N',N'-tetramethylethylenediamine (hereinafter, also referred to as "TMEDA") was added thereto per 1 mol of the following n-butyl lithium (hereinafter, also referred to as "Bu-Li"). Then, after the temperature was adjusted to 40° C., 0.149 parts by mass of Bu-Li were added per 100 parts by mass of the total amount of the butadiene monomer and the styrene monomer introduced into the reactor in the present Production Example (hereinafter referred to as all the monomers), and the reaction was continued for 60 minutes while the temperature inside the reactor was adjusted to 45° C.

(Second Step)

10.0 parts by mass of a styrene monomer were introduced thereto, and thereafter, the reaction was further continued for 20 minutes while the temperature inside the reactor was adjusted to 50° C.

(Third Step)

A cyclohexane solution containing 87.0 parts by mass of a butadiene monomer (butadiene monomer concentration: 40 mass %) was introduced thereto, and thereafter, the reaction was further continued for 40 minutes while the temperature inside the reactor was adjusted to 80° C. to obtain a butadiene-styrene-butadiene copolymer.

(Fourth Step)

As a coupling agent, 0.2 mol of tetraethoxysilane was added thereto per 1 mol of Bu-Li to crosslink a portion of the butadiene-styrene-butadiene copolymer, and as a reaction terminator, 0.3 mol of ethanol was added per 1 mol of Bu-Li to obtain a mixture of the butadiene-styrene-butadiene copolymer and a crosslinked product thereof (copolymer composition).

(Fifth Step)

The hydrogenation catalyst prepared as described above was used to continuously hydrogenate the obtained copolymer composition at 80° C. to obtain a hydrogenated copolymer composition. The amount of the catalyst was 100 ppm, and the hydrogen pressure in the hydrogenation polymerization reactor was 0.8 MPa. After the reaction was completed, 0.25 parts by mass of a stabilizer (octadecyl-3-(3,5-di-t-butyl-4-hydroxyphenyl)propionate) were added based on 100 parts by mass of the hydrogenated copolymer composition.

Production Example 2

<Polymer 2: Hydrogenated Product of Butadiene-Styrene-Butadiene (B2-A1-B1)>

A hydrogenated copolymer composition was obtained in the same manner as in Production Example 1 except that the amount of Bu-Li added in the first step was changed to 0.160 parts by mass.

Production Example 3

<Polymer 3: Hydrogenated Product of Butadiene-Styrene-Butadiene (B2-A1-B1)>

A hydrogenated copolymer composition was obtained in the same manner as in Production Example 1 except that the amount of Bu-Li added in the first step was changed to 0.172 parts by mass.

Production Example 4

<Polymer 4: Hydrogenated Product of Butadiene-Styrene-Butadiene (B2-A1-B1)>

A hydrogenated copolymer composition was obtained in the same manner as in Production Example 1 except that the amount of Bu-Li added in the first step was changed to 0.142 parts by mass.

Production Example 5

<Polymer 5: Hydrogenated Product of Butadiene-Styrene-Butadiene (B2-A1-B1)>

A hydrogenated copolymer composition was obtained in the same manner as in Production Example 1 except that the amount of Bu-Li added in the first step was changed to 0.147 parts by mass, the amount of the styrene monomer introduced in the second step was changed to 12.0 parts by mass, and the amount of the butadiene monomer introduced in the third step was changed to 85.0 parts by mass.

Production Example 6

<Polymer 6: Hydrogenated Product of Butadiene-Styrene-Butadiene (B2-A1-B1)>

A hydrogenated copolymer composition was obtained in the same manner as in Production Example 1 except that the amount of Bu-Li added in the first step was changed to 0.152 parts by mass, the amount of the styrene monomer introduced in the second step was changed to 8.0 parts by mass, and the amount of the butadiene monomer introduced in the third step was changed to 85.0 parts by mass.

Production Example 7

<Polymer 7: Hydrogenated Product of Butadiene-Styrene-Butadiene (B2-A1-B1)>

A hydrogenated copolymer composition was obtained in the same manner as in Production Example 1 except that the amount of Bu-Li added in the first step was changed to 0.138 parts by mass, the additive in the fourth step was replaced by ethyl benzoate, and the amount of ethyl benzoate was 0.30 mol per 1 mol of Bu-Li.

Production Example 8

<Polymer 8: Hydrogenated Product of Butadiene-Styrene-Butadiene (B2-A1-B1)>

A hydrogenated copolymer composition was obtained in the same manner as in Production Example 1 except that the amount of tetraethoxysilane added in the fourth step was changed to 0.1 mol per 1 mol of Bu-Li.

Production Example 9

<Polymer 9: Hydrogenated Product of Butadiene-Styrene-Butadiene (B2-A1-B1)>

A hydrogenated copolymer composition was obtained in the same manner as in Production Example 1 except that the amount of tetraethoxysilane added in the fourth step was changed to 0.32 mol per 1 mol of Bu-Li.

Production Example 10

<Polymer 10: Hydrogenated Product of Butadiene-Styrene-Butadiene (B2-A1-B1)>

A hydrogenated copolymer composition was obtained in the same manner as in Production Example 1 except that the reaction time in the first step was changed to 30 minutes.

Production Example 11

<Polymer 11: Hydrogenated Product of Butadiene-Styrene-Butadiene (B2-A1-B1)>

A hydrogenated copolymer composition was obtained in the same manner as in Production Example 1 except that the amount of the butadiene monomer for charging in the first step was changed to 11.5 parts by mass and the amount of the butadiene monomer introduced in the third step was changed to 78.5 parts by mass.

Production Example 12

<Polymer 12: Hydrogenated Product of Butadiene-Styrene-Butadiene (B2-A1-B1)>

A hydrogenated copolymer composition was obtained in the same manner as in Production Example 1 except that the amount of Bu-Li added in the first step was changed to 0.157 parts by mass, the amount of the styrene monomer introduced in the second step was changed to 4.0 parts by mass, and the amount of the butadiene monomer introduced in the third step was changed to 93.0 parts by mass.

Production Example 13

<Polymer 13: Hydrogenated Product of Butadiene-Styrene-Butadiene (B2-A1-B1)>

A hydrogenated copolymer composition was obtained in the same manner as in Production Example 1 except that the amount of Bu-Li added in the first step was changed to 0.138 parts by mass, the amount of the styrene monomer introduced in the second step was changed to 20.0 parts by mass, and the amount of the butadiene monomer introduced in the third step was changed to 77.0 parts by mass.

Production Example 14

<Polymer 14: Hydrogenated Product of Butadiene-Styrene-Butadiene (B2-A1-B1)>

A hydrogenated copolymer composition was obtained in the same manner as in Production Example 1 except that the amount of Bu-Li added in the first step was changed to 0.152 parts by mass and the amount of TMEDA added was changed to 0.49 mol per 1 mol of Bu-Li.

Production Example 15

<Polymer 15: Hydrogenated Product of Butadiene-Styrene-Butadiene (B2-A1-B1)>

A hydrogenated copolymer composition was obtained in the same manner as in Production Example 1 except that the amount of Bu-Li added in the first step was changed to 0.147 parts by mass, the amount of TMEDA added per 1 mol of Bu-Li was changed to 1.5 mol, and the temperature inside the reactor in the third step was changed to 45° C.

Production Example 16

<Polymer 16: Hydrogenated Product of Butadiene-Styrene-Butadiene (B2-A1-B1)>

A hydrogenated copolymer composition was obtained in the same manner as in Production Example 1 except that the amount of the hydrogenation catalyst in the fifth step was changed to 50 ppm.

Production Example 17

<Polymer 17: Hydrogenated Product of Butadiene-Styrene-Butadiene (B2-A1-B1)>

A hydrogenated copolymer composition was obtained in the same manner as in Production Example 1 except that the amount of Bu-Li added in the first step was changed to 0.28 parts by mass.

Production Example 18

<Polymer 18: Hydrogenated Product of Butadiene-Styrene-Butadiene (B2-A1-B1)>

A hydrogenated copolymer composition was obtained in the same manner as in Production Example 1 except that the amount of Bu-Li added in the first step was changed to 0.080 parts by mass.

Production Example 19

<Polymer 19: Hydrogenated Product of Butadiene-Styrene-Butadiene (B2-A1-B1)>

A hydrogenated copolymer composition was obtained in the same manner as in Production Example 1 except that the additive in the fourth step was replaced by silicon tetrachloride and the amount of silicon tetrachloride was 0.15 mol per 1 mol of Bu-Li.

Production Example 20

<Polymer 20: Hydrogenated Product of Styrene-Butadiene (A1-B1)>

Batch polymerization was performed in the following manner with a stirred jacketed tank reactor (internal volume: 100 L).

(First Step)

The reactor was charged with 38 L of cyclohexane and 9.0 parts by mass of a styrene monomer, and 0.8 mol of TMEDA was added thereto per 1 mol of the following Bu-Li. Then, after the temperature was adjusted to 40° C., 0.149 parts by mass of Bu-Li were added per 100 parts by mass of the total amount of the butadiene monomer and the styrene monomer introduced into the reactor in the present Production Example (hereinafter referred to as all the monomers), and the reaction was continued for 20 minutes while the temperature inside the reactor was adjusted to 50° C.

(Second Step)

A cyclohexane solution containing 91.0 parts by mass of a butadiene monomer (butadiene monomer concentration: 40 mass %) was introduced thereto, and thereafter, the reaction was further continued for 20 minutes while the temperature inside the reactor was adjusted to 80° C. to obtain a styrene-butadiene copolymer.

(Third Step)

As a reaction terminator, 0.4 mol of ethanol was added per 1 mol of Bu-Li. Thereafter, 0.3 mol of tetraethoxysilane as a coupling agent was added per 1 mol of Bu-Li to crosslink a portion of the styrene-butadiene copolymer, and thus, a mixture of the styrene-butadiene copolymer and a crosslinked product thereof (copolymer composition) was obtained.

(Fourth Step)

The hydrogenation catalyst prepared as described above was used to continuously hydrogenate the obtained copolymer composition at 80° C. to obtain a hydrogenated copolymer composition. The amount of the catalyst was 100 ppm, and the hydrogen pressure in the hydrogenation polymerization reactor was 0.8 MPa. After the reaction was completed, 0.25 parts by mass of a stabilizer (octadecyl-3-(3,5-di-t-butyl-4-hydroxyphenyl)propionate) were added based on 100 parts by mass of the hydrogenated copolymer composition.

Production Example 21

<Polymer 21: Hydrogenated Product of Styrene-Butadiene (A1-B1)>

A hydrogenated copolymer composition was obtained in the same manner as in Production Example 20 except that the amount of Bu-Li added in the first step was changed to 0.174 parts by mass.

Production Example 22

<Polymer 22: Hydrogenated Product of Styrene-Butadiene (A1-B1)>

A hydrogenated copolymer composition was obtained in the same manner as in Production Example 20 except that the amount of Bu-Li added in the first step was changed to 0.206 parts by mass.

Production Example 23

<Polymer 23: Hydrogenated Product of Styrene-Butadiene (A1-B1)>

A hydrogenated copolymer composition was obtained in the same manner as in Production Example 20 except that the amount of Bu-Li added in the first step was changed to 0.138 parts by mass.

Production Example 24

<Polymer 24: Hydrogenated Product of Styrene-Butadiene (A1-B1)>

A hydrogenated copolymer composition was obtained in the same manner as in Production Example 20 except that the amount of the styrene monomer for charging in the first step was changed to 16 parts by mass and the amount of the butadiene monomer introduced in the second step was changed to 84 parts by mass.

Production Example 25

<Polymer 25: Hydrogenated Product of Styrene-Butadiene (A1-B1)>

A hydrogenated copolymer composition was obtained in the same manner as in Production Example 20 except that the amount of the styrene monomer for charging in the first step was changed to 7 parts by mass and the amount of the butadiene monomer introduced in the second step was changed to 93 parts by mass.

Production Example 26

<Polymer 26: Hydrogenated Product of Styrene-Butadiene (A1-B1)>

A hydrogenated copolymer composition was obtained in the same manner as in Production Example 20 except that the amount of TMEDA in the first step was changed to 1.5 mol per 1 mol of Bu-Li and the temperature inside the reactor in the second step was changed to 45° C.

Production Example 27

<Polymer 27: Hydrogenated Product of Styrene-Butadiene (A1-B1)>

A hydrogenated copolymer composition was obtained in the same manner as in Production Example 20 except that the amount of TMEDA in the first step was changed to 0.5 mol per 1 mol of Bu-Li and the temperature inside the reactor in the second step was changed to 45° C.

Production Example 28

<Polymer 28: Hydrogenated Product of Butadiene-Styrene-Butadiene-Styrene (B1-A1-B2-A2)>

Batch polymerization was performed in the following manner with a stirred jacketed tank reactor (internal volume: 100 L).

(First Step)

The reactor was charged with a cyclohexane solution containing 38 L of cyclohexane and 5.0 parts by mass of a butadiene monomer (butadiene monomer concentration: 40 mass %), and 1.5 mol of TMEDA was added thereto per 1 mol of the following Bu-Li. Then, after the temperature was adjusted to 40° C., 0.057 parts by mass of Bu-Li were added per 100 parts by mass of the total amount of the butadiene monomer and the styrene monomer introduced into the reactor in the present Production Example (hereinafter referred to as all the monomers), and the reaction was continued for 60 minutes while the temperature inside the reactor was adjusted to 45° C.

(Second Step)

Thereto, 7.0 parts by mass of a styrene monomer were introduced, and thereafter, the reaction was further continued for 20 minutes while the temperature inside the reactor was adjusted to 50° C.

(Third Step)

A cyclohexane solution containing 82.0 parts by mass of a butadiene monomer (butadiene monomer concentration: 40 mass %) was introduced thereto, and thereafter, the reaction was further continued for 40 minutes while the temperature inside the reactor was adjusted to 45° C.

(Fourth Step)

After 6 parts by mass of a styrene monomer was introduced and the reaction was carried out for 20 minutes while the temperature was adjusted to 65° C., 0.9 mol of ethanol as a reaction terminator was added per 1 mol of Bu-Li to thereby obtain a butadiene-styrene-butadiene-styrene copolymer.

(Fifth Step)

The hydrogenation catalyst prepared as described above was used to continuously hydrogenate the obtained copolymer at 80° C. to obtain a hydrogenated copolymer. The amount of the catalyst was 100 ppm, and the hydrogen pressure in the hydrogenation polymerization reactor was 0.8 MPa. After the reaction was completed, 0.25 parts by mass of a stabilizer (octadecyl-3-(3,5-di-t-butyl-4-hydroxyphenyl)propionate) was added based on 100 parts by mass of the hydrogenated copolymer.

Production Example 29

<Polymer 29: Hydrogenated Product of Butadiene-Styrene-Butadiene-Styrene (B1-A1-B2-A2)>

A hydrogenated copolymer was obtained in the same manner as in Production Example 28 except that the amount of Bu-Li added in the first step was changed to 0.059 parts by mass, the amount of TMEDA added was changed to 0.8 mol per 1 mol of Bu-Li, the amount of the styrene monomer introduced in the second step was changed to 6 parts by mass, the temperature inside the reactor in the third step was changed to 80° C., the amount of the styrene monomer introduced in the fourth step was changed to 4 parts by mass, and the amount of the butadiene monomer introduced in the third step was changed to 85 parts by mass.

Production Example 30

<Polymer 30: Hydrogenated Product of Butadiene-Styrene-Butadiene-Styrene (B1-A1-B2-A2)>

A hydrogenated copolymer was obtained in the same manner as in Production Example 29 except that the amount of Bu-Li added in the first step was changed to 0.068 parts by mass.

Production Example 31

<Polymer 31: Hydrogenated Product of Butadiene-Styrene-Butadiene-Styrene (B1-A1-B2-A2)>

A hydrogenated copolymer was obtained in the same manner as in Production Example 29 except that the amount of Bu-Li added in the first step was changed to 0.093 parts by mass.

Production Example 32

<Polymer 32: Hydrogenated Product of Styrene-Butadiene (A1-B1)>

A hydrogenated copolymer composition was obtained in the same manner as in Production Example 20 except that the amount of TMEDA added in the first step was changed to 1.40 mol per 1 mol of Bu-Li, the amount of Bu-Li added was changed to 0.131 parts by mass, the amount of styrene monomer for charging was changed to 10 parts by mass, the amount of the butadiene monomer introduced in the second step was changed to 90 parts by mass, the temperature inside the reactor was changed to 45° C., no ethanol was added in the third step, the coupling agent was replaced by methyldichlorosilane, and the amount of methyldichlorosilane added was changed to 0.3 mol per 1 mol of Bu-Li.

Production Example 33

<Polymer 33: Hydrogenated Product of Styrene-Butadiene (A1-B1)>

A hydrogenated copolymer composition was obtained in the same manner as in Production Example 20 except that the amount of TMEDA added in the first step was changed to 0.45 mol per 1 mol of Bu-Li, the amount of Bu-Li added was changed to 0.157 parts by mass, the amount of the styrene monomer for charging was changed to 13 parts by mass, the amount of the butadiene monomer introduced in the second step was changed to 87 parts by mass, no ethanol was added in the third step, the coupling agent was replaced by methyldichlorosilane, and the amount of methyldichlorosilane added was changed to 0.25 mol per 1 mol of Bu-Li.

Production Example 34

<Polymer 34: Hydrogenated Product of Styrene-Butadiene (A1-B1)>

A hydrogenated copolymer composition was obtained in the same manner as in Production Example 20 except that the amount of TMEDA added in the first step was changed to 0.30 mol per 1 mol of Bu-Li, the amount of Bu-Li added was changed to 0.103 parts by mass, the amount of the styrene monomer introduced was changed to 16 parts by mass, the amount of the butadiene monomer introduced in the second step was changed to 84 parts by mass, no ethanol was added in the third step, the coupling agent was replaced by Epotohto ZX-1059 (Nippon Steel & Sumikin Chemical Co., Ltd.), and the amount of Epotohto ZX-1059 added was changed to 0.25 mol per 1 mol of Bu-Li.

Production Example 35

<Polymer 35: Hydrogenated Product of Styrene-Butadiene (A1-B1)>

A hydrogenated copolymer composition was obtained in the same manner as in Production Example 20 except that the amount of TMEDA added in the first step was changed to 1.10 mol per 1 mol of Bu-Li, the amount of Bu-Li added was changed to 0.098 parts by mass, the amount of the styrene monomer introduced was changed to 15 parts by mass, the amount of the butadiene monomer introduced in the second step was changed to 85 parts by mass, no ethanol was added in the third step, the coupling agent was replaced by Epotohto ZX-1059 (Nippon Steel & Sumikin Chemical Co., Ltd.), and the amount of Epotohto ZX-1059 added was changed to 0.275 mol per 1 mol of Bu-Li.

Production Example 36

<Polymer 36: Hydrogenated Product of Butadiene-Styrene-Butadiene (B2-A1-B1)>

A hydrogenated copolymer composition was obtained in the same manner as in Production Example 1 except that the amount of tetraethoxysilane added in the fourth step was changed to 0.28 mol per 1 mol of Bu-Li.

Production Example 37

<Polymer 37: Hydrogenated Product of Butadiene-Styrene-Butadiene (B2-A1-B1)>

A hydrogenated copolymer composition was obtained in the same manner as in Production Example 1 except that the amount of tetraethoxysilane added in the fourth step was changed to 0.25 mol per 1 mol of Bu-Li.

Production Example 38

<Polymer 38: Hydrogenated Product of Butadiene-Styrene-Butadiene (B2-A1-B1)>

A hydrogenated copolymer composition was obtained in the same manner as in Production Example 1 except that the amount of tetraethoxysilane added in the fourth step was changed to 0.14 mol per 1 mol of Bu-Li.

Production Example 39

<Polymer 39: Hydrogenated Product of Butadiene-Styrene-Butadiene (B2-A1-B1)>

A hydrogenated copolymer composition was obtained in the same manner as in Production Example 1 except that the amount of tetraethoxysilane added in the fourth step was changed to 0.16 mol per 1 mol of Bu-Li.

Production Example 40

<Polymer 40: Hydrogenated Product of Butadiene-Styrene-Butadiene (B2-A1-B1)>

A hydrogenated copolymer composition was obtained in the same manner as in Production Example 1 except that the amount of Bu-Li added in the first step was changed to 0.097 parts by mass.

Production Example 41

<Polymer 41: Hydrogenated Product of Butadiene-Styrene-Butadiene (B2-A1-B1)>

A hydrogenated copolymer composition was obtained in the same manner as in Production Example 1 except that the amount of Bu-Li added in the first step was changed to 0.107 parts by mass.

Production Example 42

<Polymer 42: Hydrogenated Product of Butadiene-Styrene-Butadiene (B2-A1-B1)>

A hydrogenated copolymer composition was obtained in the same manner as in Production Example 1 except that the amount of Bu-Li added in the first step was changed to 0.204 parts by mass.

Production Example 43

<Polymer 43: Hydrogenated Product of Butadiene-Styrene-Butadiene (B2-A1-B1)>

A hydrogenated copolymer composition was obtained in the same manner as in Production Example 1 except that the amount of Bu-Li added in the first step was changed to 0.141 parts by mass, the amount of the styrene monomer introduced in the second step was changed to 17.5 parts by mass, and the amount of the butadiene monomer introduced in the third step was changed to 79.5 parts by mass.

Production Example 44

<Polymer 44: Hydrogenated Product of Butadiene-Styrene-Butadiene (B2-A1-B1)>

A hydrogenated copolymer composition was obtained in the same manner as in Production Example 1 except that the amount of Bu-Li added in the first step was changed to 0.144 parts by mass, the amount of the styrene monomer introduced in the second step was changed to 14.5 parts by mass, and the amount of the butadiene monomer introduced in the third step was changed to 82.5 parts by mass.

Production Example 45

<Polymer 45: Hydrogenated Product of Butadiene-Styrene-Butadiene (B2-A1-B1)>

A hydrogenated copolymer composition was obtained in the same manner as in Production Example 1 except that the amount of Bu-Li added in the first step was changed to 0.155 parts by mass, the amount of the styrene monomer introduced in the second step was changed to 5.5 parts by mass, and the amount of the butadiene monomer introduced in the third step was changed to 91.5 parts by mass.

Production Example 46

<Polymer 46: Hydrogenated Product of Butadiene-Styrene-Butadiene (B2-A1-B1)>

A hydrogenated copolymer composition was obtained in the same manner as in Production Example 1 except that the amount of Bu-Li added in the first step was changed to 0.153 parts by mass, the amount of the styrene monomer introduced in the second step was changed to 7.0 parts by mass, and the amount of the butadiene monomer introduced in the third step was changed to 90.0 parts by mass.

Production Example 47

<Polymer 47: Hydrogenated Product of Butadiene-Styrene-Butadiene (B2-A1-B1)>

A hydrogenated copolymer composition was obtained in the same manner as in Production Example 1 except that the reaction time in the first step was changed to 37 minutes.

Production Example 48

<Polymer 48: Hydrogenated Product of Butadiene-Styrene-Butadiene (B2-A1-B1)>

A hydrogenated copolymer composition was obtained in the same manner as in Production Example 1 except that the reaction time in the first step was changed to 46.5 minutes.

Production Example 49

<Polymer 49: Hydrogenated Product of Butadiene-Styrene-Butadiene (B2-A1-B1)>

A hydrogenated copolymer composition was obtained in the same manner as in Production Example 1 except that the amount of the butadiene monomer for charging in the first step was changed to 1.5 parts by mass and the amount of the butadiene monomer introduced in the third step was changed to 89.0 parts by mass.

Production Example 50

<Polymer 50: Hydrogenated Product of Butadiene-Styrene-Butadiene (B2-A1-B1)>

A hydrogenated copolymer composition was obtained in the same manner as in Production Example 1 except that the amount of TMEDA added in the first step was changed to 1.5 mol per 1 mol of Bu-Li and the temperature inside the reactor in the third step was changed to 45° C.

Production Example 51

<Polymer 51: Hydrogenated Product of Butadiene-Styrene-Butadiene (B2-A1-B1)>

A hydrogenated copolymer composition was obtained in the same manner as in Production Example 1 except that the amount of TMEDA added in the first step was changed to 0.59 mol per 1 mol of Bu-Li.

Production Example 52

<Polymer 52: Hydrogenated Product of Butadiene-Styrene-Butadiene (B2-A1-B1)>

A hydrogenated copolymer composition was obtained in the same manner as in Production Example 1 except that the amount of the hydrogenation catalyst in the fifth step was changed to 63 ppm.

Production Example 53

<Polymer 53: Hydrogenated Product of Butadiene-Styrene-Butadiene (B2-A1-B1)>

A hydrogenated copolymer composition was obtained in the same manner as in Production Example 1 except that the amount of the hydrogenation catalyst in the fifth step was changed to 71 ppm.

Production Example 54

<Polymer 54: Hydrogenated Product of Butadiene-Styrene-Butadiene (B2-A1-B1)>

A hydrogenated copolymer composition was obtained in the same manner as in Production Example 1 except that the amount of the hydrogenation catalyst in the fifth step was changed to 78 ppm.

The structures of the component (a) and the component (b) included in the hydrogenated copolymer compositions obtained in Production Examples 1 to 19 and 36 to 54 are each shown in Table 1. The physical properties of these hydrogenated copolymer compositions are also shown in Table 1.

TABLE 1

| | Polymer structure | | | | | | | |
|---|---|---|---|---|---|---|---|---|
| | Production Example 1 | Production Example 2 | Production Example 3 | Production Example 4 | Production Example 5 | Production Example 6 | Production Example 7 | Production Example 8 |
| Component (a) | B2-A1-B1 | B2-A1-B1 | B2-A1-B1 | B2-A1-B1 | B2-A1-B1 | B2-A1-B1 | B2-A1-B1 | B2-A1-B1 |
| Component (b) | (B2-A1-B1-)n-X | (B2-A1-B1-)n-X | (B2-A1-B1-)n-X | (B2-A1-B1-)n-X | (B2-A1-B1-)n-X | (B2-A1-B1-)n-X | (B2-A1-B1-)n-X | (B2-A1-B1-)n-X |
| (a)/(b) | 40/60 | 40/60 | 40/60 | 40/60 | 40/60 | 40/60 | 40/60 | 70/30 |
| PMwA | 75000 | 70000 | 65000 | 79000 | 75000 | 75000 | 81000 | 75000 |
| PMwB | 225000 | 210000 | 195000 | 237000 | 225000 | 225000 | 162000 | 225000 |
| PMwB/PMwA | 3.0 | 3.0 | 3.0 | 3.0 | 3.0 | 3.0 | 2.0 | 3.0 |
| TS | 10 | 10 | 10 | 10 | 12 | 8 | 10 | 10 |
| Block content | 95 | 95 | 95 | 95 | 95 | 95 | 95 | 96 |
| Number of parts of A1 | 10 | 9.5 | 9.5 | 9.5 | 11.4 | 7.6 | 9.5 | 10 |
| Number of parts of A2 | 0 | 0 | 0 | 0 | 0 | 0 | 0 | 0 |
| Number of parts of B1 | 87 | 87.5 | 87.5 | 87.5 | 85.6 | 89.4 | 87.5 | 87 |
| Number of parts of B2 | 3 | 3 | 3 | 3 | 3 | 3 | 3 | 3 |

TABLE 1-continued

| | | | | | | | | |
|---|---|---|---|---|---|---|---|---|
| Amount of vinyl bonds | 58 | 58 | 58 | 58 | 58 | 58 | 58 | 58 |
| Degree of hydrogenation | 99 | 99 | 99 | 99 | 99 | 99 | 99 | 99 |
| MFR | 8.7 | 11.7 | 16 | 6.2 | 7 | 10 | 10 | 30 |
| Capillary viscosity | 479 | 384 | 310 | 492 | 549 | 420 | 440 | 210 |
| (Expression 1) C + 20.8M | 660 | 627 | 643 | 621 | 695 | 628 | 648 | 834 |

| | Polymer structure | | | | | | | |
|---|---|---|---|---|---|---|---|---|
| | Production Example 9 | Production Example 10 | Production Example 11 | Production Example 12 | Production Example 13 | Production Example 14 | Production Example 15 | Production Example 16 |
| Component (a) | B2-A1-B1 | B2-A1-B1 | B2-A1-B1 | B2-A1-B1 | B2-A1-B1 | B2-A1-B1 | B2-A1-B1 | B2-A1-B1 |
| Component (b) | (B2-A1-B1-)n-X | (B2-A1-B1-)n-X | (B2-A1-B1-)n-X | (B2-A1-B1-)n-X | (B2-A1-B1-)n-X | (B2-A1-B1-)n-X | (B2-A1-B1-)n-X | (B2-A1-B1-)n-X |
| (a)/(b) | 5/95 | 40/60 | 40/60 | 40/60 | 40/60 | 40/60 | 40/60 | 40/60 |
| PMwA | 75000 | 75000 | 75000 | 75000 | 75000 | 75000 | 75000 | 75000 |
| PMwB | 225000 | 225000 | 225000 | 225000 | 225000 | 225000 | 225000 | 225000 |
| PMwB/PMwA | 3.0 | 3.0 | 3.0 | 3.0 | 3.0 | 3.0 | 3.0 | 3.0 |
| TS | 10 | 10 | 10 | 4 | 20 | 10 | 10 | 10 |
| Block content | 95 | 70 | 92 | 96 | 97 | 94 | 95 | 92 |
| Number of parts of A1 | 10 | 10 | 10 | 4 | 20 | 10 | 10 | 10 |
| Number of parts of A2 | 0 | 0 | 0 | 0 | 0 | 0 | 0 | 0 |
| Number of parts of B1 | 87 | 87 | 78.5 | 93 | 77 | 87 | 87 | 87 |
| Number of parts of B2 | 3 | 3 | 11.5 | 3 | 3 | 3 | 3 | 3 |
| Amount of vinyl bonds | 58 | 58 | 58 | 58 | 58 | 35 | 75 | 58 |
| Degree of hydrogenation | 99 | 99 | 99 | 99 | 99 | 99 | 99 | 75 |
| MFR | 2 | 12 | 22 | 25 | 3 | 3 | 21 | 22 |
| Capillary viscosity | 1240 | 550 | 290 | 230 | 650 | 610 | 290 | 280 |
| (Expression 1) C + 20.8M | 1282 | 800 | 748 | 750 | 712 | 672 | 727 | 738 |

| | Polymer structure | | | | | | | |
|---|---|---|---|---|---|---|---|---|
| | Production Example 17 | Production Example 18 | Production Example 19 | Production Example 36 | Production Example 37 | Production Example 38 | Production Example 39 | Production Example 40 |
| Component (a) | B2-A1-B1 | B2-A1-B1 | B2-A1-B1 | B2-A1-B1 | B2-A1-B1 | B2-A1-B1 | B2-A1-B1 | B2-A1-B1 |
| Component (b) | (B2-A1-B1-)n-X | (B2-A1-B1-)n-X | (B2-A1-B1-)n-X | (B2-A1-B1-)n-X | (B2-A1-B1-)n-X | (B2-A1-B1-)n-X | (B2-A1-B1-)n-X | (B2-A1-B1-)n-X |
| (a)/(b) | 40/60 | 40/60 | 40/60 | 15/85 | 25/75 | 57.5/42.5 | 52.5/47.5 | 40/60 |
| PMwA | 40000 | 140000 | 60000 | 55000 | 75000 | 75000 | 75000 | 115000 |
| PMwB | 120000 | 420000 | 246000 | 165000 | 225000 | 225000 | 225000 | 345000 |
| PMwB/PMwA | 3.0 | 3.0 | 4.1 | 3.0 | 3.0 | 3.0 | 3.0 | 3.0 |
| TS | 10 | 10 | 10 | 10 | 10 | 10 | 10 | 10 |
| Block content | 91 | 95 | 94 | 95 | 95 | 95 | 95 | 95 |
| Number of parts of A1 | 10 | 10 | 10 | 10 | 10 | 10 | 10 | 10 |
| Number of parts of A2 | 0 | 0 | 0 | 0 | 0 | 0 | 0 | 0 |
| Number of parts of B1 | 87 | 87 | 87 | 87 | 87 | 87 | 87 | 87 |
| Number of parts of B2 | 3 | 3 | 3 | 3 | 3 | 3 | 3 | 3 |
| Amount of vinyl bonds | 58 | 58 | 58 | 58 | 58 | 58 | 58 | 58 |
| Degree of hydrogenation | 99 | 99 | 99 | 99 | 99 | 99 | 99 | 99 |
| MFR | 30 | 3 | 8.5 | 5 | 6 | 18 | 15 | 4.1 |
| Capillary viscosity | 160 | 650 | 605 | 590 | 560 | 315 | 335 | 590 |
| (Expression 1) C + 20.8M | 784 | 712 | 782 | 694 | 685 | 689 | 647 | 675 |

TABLE 1-continued

| | Polymer structure | | | | | | | |
|---|---|---|---|---|---|---|---|---|
| | Production Example 41 | Production Example 42 | Production Example 43 | Production Example 44 | Production Example 45 | Production Example 46 | Production Example 47 | Production Example 48 |
| Component (a) | B2-A1-B1 | B2-A1-B2 | B2-A1-B1 | B2-A1-B1 | B2-A1-B1 | B2-A1-B1 | B2-A1-B1 | B2-A1-B1 |
| Component (b) | (B2-A1-B1-)n-X | (B2-A1-B2-)n-X | (B2-A1-B1-)n-X | (B2-A1-B1-)n-X | (B2-A1-B1-)n-X | (B2-A1-B1-)n-X | (B2-A1-B1-)n-X | (B2-A1-B1-)n-X |
| (a)/(b) | 40/60 | 40/60 | 40/60 | 40/60 | 40/60 | 40/60 | 40/60 | 40/60 |
| PMwA | 105000 | 55000 | 75000 | 75000 | 75000 | 75000 | 75000 | 75000 |
| PMwB | 315000 | 165000 | 225000 | 225000 | 225000 | 225000 | 225000 | 225000 |
| PMwB/PMwA | 3.0 | 3.0 | 3 | 3 | 3 | 3 | 3 | 3 |
| TS | 10 | 10 | 17.5 | 14.5 | 5.5 | 7 | 10 | 10 |
| Block content | 95 | 95 | 95 | 95 | 95 | 95 | 77.5 | 85 |
| Number of parts of A1 | 10 | 10 | 17.5 | 14.5 | 5.5 | 7 | 10 | 10 |
| Number of parts of A2 | 0 | 0 | 0 | 0 | 0 | 0 | 0 | 0 |
| Number of parts of B1 | 87 | 87 | 79.5 | 82.5 | 91.5 | 90 | 87 | 87 |
| Number of parts of B2 | 3 | 3 | 3 | 3 | 3 | 3 | 3 | 3 |
| Amount of vinyl bonds | 58 | 58 | 58 | 58 | 58 | 58 | 58 | 58 |
| Degree of hydrogenation | 99 | 99 | 99 | 99 | 99 | 99 | 99 | 99 |
| MFR | 5 | 19 | 4.5 | 6 | 19 | 13 | 10.5 | 9.5 |
| Capillary viscosity | 550 | 310 | 590 | 570 | 310 | 360 | 525 | 500 |
| (Expression 1) C + 20.8M | 654 | 705 | 684 | 695 | 705 | 630 | 743 | 698 |

| | Polymer structure | | | | | |
|---|---|---|---|---|---|---|
| | Production Example 49 | Production Example 50 | Production Example 51 | Production Example 52 | Production Example 53 | Production Example 54 |
| Component (a) | B2-A1-B1 | B2-A1-B1 | B2-A1-B1 | B2-A1-B1 | B2-A1-B1 | B2-A1-B1 |
| Component (b) | (B2-A1-B1-)n-X | (B2-A1-B1-)n-X | (B2-A1-B1-)n-X | (B2-A1-B1-)n-X | (B2-A1-B1-)n-X | (B2-A1-B1-)n-X |
| (a)/(b) | 40/60 | 40/60 | 40/60 | 40/60 | 40/60 | 40/60 |
| PMwA | 75000 | 75000 | 75000 | 75000 | 75000 | 75000 |
| PMwB | 225000 | 225000 | 225000 | 225000 | 225000 | 225000 |
| PMwB/PMwA | 3 | 3 | 3 | 3 | 3 | 3 |
| TS | 10 | 10 | 10 | 10 | 10 | 10 |
| Block content | 95 | 95 | 95 | 95 | 95 | 95 |
| Number of parts of A1 | 10 | 10 | 10 | 10 | 10 | 10 |
| Number of parts of A2 | 0 | 0 | 0 | 0 | 0 | 0 |
| Number of parts of B1 | 88.5 | 87 | 87 | 87 | 87 | 87 |
| Number of parts of B2 | 1.5 | 3 | 3 | 3 | 3 | 3 |
| Amount of vinyl bonds | 58 | 67.5 | 42.5 | 58 | 58 | 58 |
| Degree of hydrogenation | 99 | 99 | 99 | 83 | 87.5 | 91 |
| MFR | 8.4 | 13 | 6 | 17 | 13 | 11 |
| Capillary viscosity | 575 | 410 | 530 | 320 | 380 | 430 |
| (Expression 1) C + 20.8M | 750 | 680 | 655 | 674 | 650 | 659 |

PMwA: peak top molecular weight of component (a)
PMwB: peak top molecular weight of component (b)
TS: content of vinyl aromatic monomer unit (Evaluation of Properties of Adhesive Film Using Hydrogenated Copolymer Composition of Each of Production Examples 1 to 19 and 36 to 54)

The hydrogenated copolymer composition to constitute the tacky layer, and a tackifier (manufactured by Yasuhara Chemical Co., LTD., trade name "YS Polystar G150") (10 parts by mass based on 100 parts by mass of the hydrogenated copolymer composition) were homogeneously mixed. The mixture to constitute the tacky layer and polypropylene (manufactured by SunAllomer Ltd., trade name "PC684S", MFR (230° C., load: 2.16 kg)=7.5 g/10 min) to constitute the substrate layer were coextruded by a T-die coextrusion method such that both the layers were integrated to thereby produce an adhesive film having a substrate layer thickness of 50 μm and a tacky layer thickness of 8

The adhesive film comprising the tacky layer including the hydrogenated copolymer composition obtained of each of Production Examples 1 to 19 and 36 to 54 was used to evaluate the initial tackiness and the increase in tackiness. The evaluation results are shown in the following Table 2.

TABLE 2

|  | Example 1 | Example 2 | Example 3 | Example 4 | Example 5 | Example 6 | Example 7 | Comparative Example 1 |
|---|---|---|---|---|---|---|---|---|
|  | | | | Polymer | | | | |
|  | Production Example 1 | Production Example 2 | Production Example 3 | Production Example 4 | Production Example 5 | Production Example 6 | Production Example 7 | Production Example 8 |
| Initial tackiness | ○ | ○ | ○ | ○ | ○ | ○ | ○ | × |
| Increase in tackiness | ○ | Δ | Δ | ○ | ○ | Δ | ○ | × |
| Processability | ○ | ○ | ○ | ○ | Δ | ○ | ○ | Δ |
| Coefficient of variation of initial tack strength | ○ | ○ | ○ | Δ | Δ | ○ | ○ | Δ |

|  | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|
|  | | | | Polymer | | | | |
|  | Production Example 9 | Production Example 10 | Production Example 11 | Production Example 12 | Production Example 13 | Production Example 14 | Production Example 15 | Production Example 16 |
| Initial tackiness | Δ | Δ | ○ | Δ | × | Δ | Δ | Δ |
| Increase in tackiness | Δ | × | × | × | ○ | Δ | × | × |
| Processability | × | × | Δ | × | × | × | Δ | × |
| Coefficient of variation of initial tack strength | × | × | Δ | × | × | × | Δ | × |

|  | Comparative Example 10 | Comparative Example 11 | Comparative Example 12 | Example 15 | Example 16 | Example 17 | Example 18 | Example 19 |
|---|---|---|---|---|---|---|---|---|
|  | | | | Polymer | | | | |
|  | Production Example 17 | Production Example 18 | Production Example 19 | Production Example 36 | Production Example 37 | Production Example 38 | Production Example 39 | Production Example 40 |
| Initial tackiness | ○ | Δ | Δ | Δ | ○ | ○ | ○ | Δ |
| Increase in tackiness | × | Δ | Δ | ○ | ○ | Δ | ○ | ○ |
| Processability | × | × | × | Δ | Δ | Δ | Δ | Δ |
| Coefficient of variation of initial tack strength | × | × | × | Δ | Δ | Δ | Δ | Δ |

|  | Example 20 | Example 21 | Example 22 | Example 23 | Example 24 | Example 25 | Example 26 | Example 27 |
|---|---|---|---|---|---|---|---|---|
|  | | | | Polymer | | | | |
|  | Production Example 41 | Production Example 42 | Production Example 43 | Production Example 44 | Production Example 45 | Production Example 46 | Production Example 47 | Production Example 48 |
| Initial tackiness | ○ | ○ | Δ | ○ | ○ | ○ | ○ | ○ |
| Increase in tackiness | ○ | Δ | ○ | ○ | Δ | Δ | Δ | ○ |
| Processability | Δ | Δ | Δ | Δ | Δ | ○ | Δ | Δ |
| Coefficient of variation of initial tack strength | Δ | Δ | Δ | Δ | Δ | ○ | Δ | Δ |

|  | Example 28 | Example 29 | Example 30 | Example 31 | Example 32 | Example 33 |
|---|---|---|---|---|---|---|
|  | | | Polymer | | | |
|  | Production Example 49 | Production Example 50 | Production Example 51 | Production Example 52 | Production Example 53 | Production Example 54 |
| Initial tackiness | ○ | ○ | Δ | ○ | ○ | ○ |
| Increase in tackiness | ○ | Δ | ○ | Δ | Δ | ○ |
| Processability | Δ | ○ | Δ | Δ | ○ | ○ |
| Coefficient of variation of initial tack strength | Δ | ○ | Δ | Δ | ○ | ○ |

As shown in Table 2, Examples 1 to 7 and 15 to 33 exhibited excellent performance in the initial tackiness and increase in tackiness. When the fabricability was good and the tacky layer had few uneven thicknesses, the tack strength had few variations as well, and the result of coefficient of variation of the initial tack strength was also good. On the other hand, in Comparative Examples 1 to 12, the initial tackiness, increase in tackiness, and fabricability were not practically evaluated as good.

The structures of the component (a) and the component (b) included in the hydrogenated copolymer compositions obtained in Production Examples 1 to 7, 20 to 27, and 32 to 35 and the structure of the hydrogenated copolymers obtained in Production Examples 28 to 31 are shown in Table 3. The physical properties of these hydrogenated copolymer compositions and hydrogenated copolymers are also shown in Table 3.

TABLE 3

| | Polymer structure | | | | | | |
|---|---|---|---|---|---|---|---|
| | Production Example 1 | Production Example 2 | Production Example 3 | Production Example 4 | Production Example 5 | Production Example 6 | Production Example 7 |
| Component (a) | B2-A1-B1 | B2-A1-B1 | B2-A1-B1 | B2-A1-B1 | B2-A1-B1 | B2-A1-B1 | B2-A1-B1 |
| Component (b) | (B2-A1-B1-) n-X | (B2-A1-B1-) n-X | (B2-A1-B1-) n-X | (B2-A1-B1-) n-X | (B2-A1-B1-) n-X | (B2-A1-B1-) n-X | (B2-A1-B1-) n-X |
| (a)/(b) | 40/60 | 40/60 | 40/60 | 40/60 | 40/60 | 40/60 | 40/60 |
| PMwA | 75000 | 70000 | 65000 | 79000 | 75000 | 75000 | 81000 |
| PMwB | 225000 | 210000 | 195000 | 237000 | 225000 | 225000 | 162000 |
| PMwB/PMwA | 3.0 | 3.0 | 3.0 | 3.0 | 3.0 | 3.0 | 2.0 |
| TS | 10 | 10 | 10 | 10 | 12 | 8 | 10 |
| Block content | 95 | 95 | 95 | 95 | 95 | 95 | 95 |
| Number of parts of A1 | 10 | 9.5 | 9.5 | 9.5 | 11.4 | 7.6 | 9.5 |
| Number of parts of A2 | 0 | 0 | 0 | 0 | 0 | 0 | 0 |
| Number of parts of B1 | 87 | 87.5 | 87.5 | 87.5 | 85.6 | 89.4 | 87.5 |
| Number of parts of B2 | 3 | 3 | 3 | 3 | 3 | 3 | 3 |
| Amount of vinyl bonds | 58 | 58 | 58 | 58 | 58 | 58 | 58 |
| Degree of hydrogenation | 99 | 99 | 99 | 99 | 99 | 99 | 99 |
| MFR | 8.7 | 11.7 | 16 | 6.2 | 7 | 10 | 10 |
| Capillary viscosity | 479 | 384 | 310 | 492 | 549 | 420 | 440 |
| (Expression 1) C + 20.8M | 660 | 627 | 643 | 621 | 695 | 628 | 648 |

| | Polymer structure | | | | | | | |
|---|---|---|---|---|---|---|---|---|
| | Production Example 20 | Production Example 21 | Production Example 22 | Production Example 23 | Production Example 24 | Production Example 25 | Production Example 26 | Production Example 27 |
| Component (a) | A1-B1 | A1-B1 | A1-B1 | Al-B1 | Al-B1 | A1-B1 | A1-B1 | A1-B1 |
| Component (b) | (A1-B1) n-X | (A1-B1) n-X | (A1-B1) n-X | (A1-B1) n-X | (A1-B1) n-X | (A1-B1) n-X | (A1-B1) n-X | (A1-B1) n-X |
| (a)/(b) | 40/60 | 40/60 | 30/70 | 50/50 | 40/60 | 40/60 | 40/60 | 40/60 |
| PMwA | 76000 | 65000 | 55000 | 82000 | 76000 | 76000 | 76000 | 76000 |
| PMwB | 150000 | 130000 | 110000 | 164000 | 150000 | 150000 | 150000 | 150000 |
| PMwB/PMwA | 2.0 | 2.0 | 2.0 | 2.0 | 2.0 | 2.0 | 2.0 | 2.0 |
| TS | 9 | 9.4 | 9.4 | 9 | 16 | 7 | 9 | 9 |
| Block content | 97 | 97 | 98 | 96 | 97 | 97 | 95 | 95 |
| Number of parts of A1 | 8.7 | 9.1 | 9.2 | 8.6 | 15.5 | 6.8 | 8.6 | 8.6 |
| Number of parts of A2 | 0 | 0 | 0 | 0 | 0 | 0 | 0 | 0 |
| Number of parts of B1 | 91.3 | 90.9 | 90.8 | 91.4 | 84.5 | 93.2 | 91.5 | 91.5 |
| Number of parts of B2 | 0 | 0 | 0 | 0 | 0 | 0 | 0 | 0 |
| Amount of vinyl bonds | 54 | 54 | 54 | 54 | 54 | 54 | 68 | 42 |
| Degree of hydrogenation | 99 | 99 | 99 | 99 | 99 | 99 | 99 | 99 |
| MFR | 7 | 10 | 20 | 5 | 0.5 | 13 | 9 | 5 |
| Capillary viscosity | 630 | 580 | 370 | 720 | 910 | 515 | 600 | 700 |
| (Expression 1) C + 20.8M | 776 | 788 | 786 | 824 | 920 | 785 | 787 | 804 |

| | Polymer structure | | | | | | | |
|---|---|---|---|---|---|---|---|---|
| | Production Example 28 | Production Example 29 | Production Example 30 | Production Example 31 | Production Example 32 | Production Example 33 | Production Example 34 | Production Example 35 |
| Component (a) | — | — | — | — | A1-B1 | A1-B1 | A1-B1 | A1-B1 |
| Component (b) | B1-A1-B2-A2 | B1-A1-B2-A2 | B1-A1-B2-A2 | B1-A1-B2-A2 | (A1-B1) 2-X | (A1-B1) 2-X | (A1-B1) 2-X | (A1-B1) 2-X |
| (a)/(b) | — | — | — | — | 40/60 | 50/50 | 50/50 | 45/55 |
| PMwA | 190000 | 190000 | 165000 | 120000 | 85000 | 70500 | 105000 | 110000 |
| PMwB | — | — | — | — | 170000 | 141000 | 211000 | 220000 |
| PMwB/PMwA | — | — | — | — | 2.0 | 2.0 | 2.0 | 2.0 |
| TS | 13 | 10 | 10 | 10 | 10 | 13 | 16 | 15 |
| Block content | 92 | 93 | 94 | 94 | 95 | 95 | 95 | 95 |
| Number of parts of A1 | 12 | 9.3 | 9.4 | 9.4 | 10 | 13 | 16 | 15 |
| Number of parts of A2 | 6 | 4 | 4 | 4 | 0 | 0 | 0 | 0 |
| Number of parts of B1 | 77 | 81.7 | 81.6 | 81.6 | 90 | 87 | 84 | 85 |
| Number of parts of B2 | 5 | 5 | 5 | 5 | 0 | 0 | 0 | 0 |
| Amount of vinyl bonds | 76 | 58 | 58 | 58 | 65 | 40 | 32 | 60 |
| Degree of hydrogenation | 99 | 99 | 99 | 99 | 98 | 98 | 98 | 75 |
| MFR | 5 | 3 | 11 | 19 | 4.9 | 1.4 | 0.1 | 0.9 |
| Capillary viscosity | 1000 | 1200 | 820 | 560 | 660 | 880 | 1220 | 900 |
| (Expression 1) C + 20.8M | 1104 | 1262 | 1049 | 955 | 762 | 909 | 1222 | 919 |

(Evaluation of Properties of Adhesive Film Using Hydrogenated Copolymer Composition or Hydrogenated Copolymer of Production Examples 1 to 7 and 20 to 35)

The hydrogenated copolymer composition or hydrogenated copolymer to constitute the tacky layer, and a tackifier (manufactured by Yasuhara Chemical Co., LTD., trade name "YS Resin PX1150N") (10 parts by mass based on 100 parts by mass of the hydrogenated copolymer composition) were homogeneously mixed. The mixture to constitute the tacky layer and polypropylene (manufactured by SunAllomer Ltd., trade name "PC684S", MFR (230° C., load: 2.16 kg)=7.5 g/10 min) to constitute the substrate layer were coextruded by a T-die coextrusion method such that both the layers were integrated to thereby produce an adhesive film having a breadth of 50 cm, a substrate layer thickness of 50 and a tacky layer thickness of 8 μm.

The adhesive films comprising the tacky layer including the hydrogenated copolymer composition or hydrogenated copolymer obtained in each of Production Examples 1 to 7 and 20 to 35 were used to evaluate the initial tackiness, the increase in tackiness, and the fabricability. The evaluation results are shown in the following Table 4.

As shown in Table 4, Examples 8 to 14 exhibited excellent performance in the initial tackiness, increase in tackiness, and fabricability. When the fabricability was good, the tack strength had few variations as well, and the result of coefficient of variation of the initial tack strength was also good.

On the other hand, in Comparative Examples 13 to 28, the initial tackiness, increase in tackiness, and fabricability were not practically evaluated as good. As described above, in the hydrogenated copolymer compositions having a specific structure, particularly when the relationship between the capillary viscosity and the MFR falls within a specific range, the balance between the fabricability and the tackiness performance was confirmed to be highly achieved.

(Evaluation of Properties of Resin Compositions Using Hydrogenated Copolymer Composition of Each of Production Example 1, Production Example 14, Production Example 15, and Production Example 30)

The resin composition formulations and evaluation results of physical properties of injection molded plates are shown in the following Table 5.

TABLE 4

| | Example 8 | Example 9 | Example 10 | Example 11 | Example 12 | Example 13 | Example 14 |
|---|---|---|---|---|---|---|---|
| Polymer | | | | | | | |
| | Production Example 1 | Production Example 2 | Production Example 3 | Production Example 4 | Production Example 5 | Production Example 6 | Production Example 7 |
| Initial tackiness | ○ | ○ | ○ | ○ | ○ | ○ | ○ |
| Increase in tackiness | ○ | Δ | Δ | ○ | ○ | Δ | ○ |
| Processability | ○ | ○ | ○ | ○ | Δ | ○ | ○ |
| Coefficient of variation of initial tack strength | ○ | ○ | ○ | Δ | Δ | ○ | ○ |

| | Comparative Example 13 | Comparative Example 14 | Comparative Example 15 | Comparative Example 16 | Comparative Example 17 | Comparative Example 18 | Comparative Example 19 | Comparative Example 20 |
|---|---|---|---|---|---|---|---|---|
| Polymer | | | | | | | | |
| | Production Example 20 | Production Example 21 | Production Example 22 | Production Example 23 | Production Example 24 | Production Example 25 | Production Example 26 | Production Example 27 |
| Initial tackiness | Δ | Δ | ○ | Δ | × | × | Δ | × |
| Increase in tackiness | Δ | Δ | × | ○ | Δ | Δ | Δ | × |
| Processability | Δ | Δ | Δ | × | × | × | × | Δ |
| Coefficient of variation of initial tack strength | Δ | Δ | Δ | × | × | × | × | Δ |

| | Comparative Example 21 | Comparative Example 22 | Comparative Example 23 | Comparative Example 24 | Comparative Example 25 | Comparative Example 26 | Comparative Example 27 | Comparative Example 28 |
|---|---|---|---|---|---|---|---|---|
| Polymer | | | | | | | | |
| | Production Example 28 | Production Example 29 | Production Example 30 | Production Example 31 | Production Example 32 | Production Example 33 | Production Example 34 | Production Example 35 |
| Initial tackiness | × | × | Δ | × | Δ | × | × | × |
| Increase in tackiness | × | Δ | Δ | Δ | Δ | × | × | × |
| Processability | × | × | Δ | Δ | × | × | × | × |
| Coefficient of variation of initial tack strength | × | × | Δ | Δ | × | × | × | × |

TABLE 5

| | | Example 34 | Example 35 | Comparative Example 29 | Comparative Example 30 | Comparative Example 31 | Comparative Example 32 | Comparative Example 33 | Comparative Example 34 |
|---|---|---|---|---|---|---|---|---|---|
| | PP(PM970A) | 60 | 70 | 60 | 60 | 60 | 70 | 70 | 70 |
| | Talc (P-3) | 20 | 20 | 20 | 20 | 20 | 20 | 20 | 20 |
| Hydrogenated copolymer composition | Production Example 1 | 20 | 10 | | | | | | |
| | Production Example 14 | | | 20 | | | 10 | | |
| | Production Example 15 | | | | 20 | | | 10 | |
| | Production Example 30 | | | | | 20 | | | 10 |
| Test items | Tensile elongation at break | 3 | 3 | 2 | 2 | 2 | 1 | 1 | 1 |
| | Impact resistance (−30° C.) | 3 | 3 | 3 | 1 | 3 | 3 | 1 | 2 |
| | Mold shrinkability | 3 | 3 | 1 | 3 | 1 | 1 | 3 | 2 |

It can be seen from Table 5 that, in Examples 34 and 35, the resin compositions are excellent in the tensile elongation at break, impact resistance at low temperatures, low mold shrinkability, and balance among various performance properties, none of which is rated as "1".

It can be seen that, in Comparative Examples 29 to 34, which do not satisfy the requirements of the present invention, the resin compositions are inferior in the tensile elongation at break, impact resistance at low temperatures, low mold shrinkability, and balance among various performance properties, some of which are rated as "1".

INDUSTRIAL APPLICABILITY

The hydrogenated copolymer composition, adhesive material composition and adhesive film, and resin composition of the present invention are widely used in fields such as footwear, plastic modification, asphalt modification, and adhesive materials, household products, packaging materials for consumer electrical appliances and industrial parts, toys, and the like.

The invention claimed is:

1. A hydrogenated copolymer composition comprising:
a component (a) comprising a polymer block comprising a vinyl aromatic monomer unit as a main component and a polymer block comprising a conjugated diene monomer unit as a main component; and
a component (b) comprising a polymer block comprising a vinyl aromatic monomer unit as a main component and a polymer block comprising a conjugated diene monomer unit as a main component, wherein
the component (a) has a peak top molecular weight of 50,000 to 120,000,
the component (b) has a peak top molecular weight 1.8 times to 3.8 times the peak top molecular weight of the component (a),
81 mol % or more of double bonds of the conjugated diene monomer unit included in the hydrogenated copolymer composition is hydrogenated,
a content of the vinyl aromatic monomer unit included in the hydrogenated copolymer composition is 5 to 18 mass % based on the composition,
a block content of the vinyl aromatic monomer unit included in the hydrogenated copolymer composition is 75 mass % or more,
a melt flow rate (MFR) of the hydrogenated copolymer composition is 4 to 20 g/10 min,
a capillary viscosity of the hydrogenated copolymer composition is 300 to 600 Pa·s, and
when the capillary viscosity is denoted by C [Pa·s] and the MFR is denoted by M [g/10 min], a relationship of (Expression 1):

$$C \leq -20.8M + 754.2 \quad \text{(Expression 1)}$$

is satisfied, wherein
the component (a) and the component (b) are each represented by the following formulas:

$$B2\text{-}A1\text{-}B1 \text{ and/or } B2\text{-}A1\text{-}B1\text{-}X \qquad \text{component (a):}$$

$$(B2\text{-}A1\text{-}B1)_n X \qquad \text{component (b):}$$

wherein
A1 is a polymer block comprising a vinyl aromatic monomer unit as a main component,
B1 and B2 are each independently a polymer block comprising a conjugated diene monomer unit as a main component,
n is an integer of 2 or greater, and
X is a residue of a coupling agent.

2. The hydrogenated copolymer composition according to claim 1, wherein the component (a)/the component (b) in terms of mass proportion is 60/40 to 10/90.

3. The hydrogenated copolymer composition according to claim 1, wherein a vinyl bond content of the conjugated diene monomer unit included in the hydrogenated copolymer composition is 40 mol % to 70 mol %.

4. The hydrogenated copolymer composition according to claim 3, wherein the vinyl bond content is 40 mol % to 61.9 mol %.

5. The hydrogenated copolymer composition according to claim 1, wherein a content of B2 included in the hydrogenated copolymer composition is 3 to 10 mass % based on the composition.

6. An adhesive material composition comprising the hydrogenated copolymer composition according to claim 1 and a tackifier.

7. An adhesive film comprising the adhesive material composition according to claim 6.

* * * * *